(12) United States Patent
Gries et al.

(10) Patent No.: US 11,125,317 B2
(45) Date of Patent: Sep. 21, 2021

(54) GUIDE MEMBER AND A DRIVE UNIT ASSEMBLY USING THE SAME

(71) Applicant: Dana Heavy Vehicle Systems Group, LLC, Maumee, OH (US)

(72) Inventors: Aaron D. Gries, Perrysburg, OH (US); Steven Mastroianni, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/868,881

(22) Filed: May 7, 2020

(65) Prior Publication Data

US 2020/0355257 A1 Nov. 12, 2020

Related U.S. Application Data

(60) Provisional application No. 62/844,485, filed on May 7, 2019, provisional application No. 62/847,518, filed on May 14, 2019.

(51) Int. Cl.
| | |
|---|---|
| *F16H 57/04* | (2010.01) |
| *B60T 17/00* | (2006.01) |
| *B60B 35/12* | (2006.01) |
| *B60B 35/16* | (2006.01) |
| *F16H 57/023* | (2012.01) |
| *F16H 57/00* | (2012.01) |

(52) U.S. Cl.
CPC ....... *F16H 57/0423* (2013.01); *B60B 35/121* (2013.01); *B60B 35/16* (2013.01); *B60T 17/00* (2013.01); *F16H 57/045* (2013.01); *F16H 57/0483* (2013.01); *F16H 57/023* (2013.01); *F16H 57/0421* (2013.01); *F16H 57/0445* (2013.01); *F16H 57/0457* (2013.01); *F16H 2057/0056* (2013.01)

(58) Field of Classification Search
CPC ............... F16H 57/0483; F16H 57/045; F16H 57/0457; F16H 57/042; F16H 57/0423; F16H 57/0445; F16H 57/0421; F16H 57/023; F16H 57/028; F16H 2057/023
See application file for complete search history.

(56) References Cited

U.S. PATENT DOCUMENTS

| | | | |
|---|---|---|---|
| 1,966,434 | A * | 5/1931 | Barker |
| 3,110,095 | A | 11/1963 | Peickii |
| 3,715,935 | A | 2/1973 | Ebey |

(Continued)

FOREIGN PATENT DOCUMENTS

| | | |
|---|---|---|
| WO | 2013192262 | 12/2013 |

*Primary Examiner* — Charles A Fox
*Assistant Examiner* — Ryan P Dodd
(74) *Attorney, Agent, or Firm* — Marshall & Melhorn, LLC

(57) ABSTRACT

One or more guide members for use within a drive unit assembly of a vehicle. The one or more guide members have a body portion with an outer peripheral surface, a first end portion, a second end portion, and an intermediate portion interposed between the first end portion and second end portion. The intermediate portion of the one or more guide members have a first angularly bent portion defining a first extending portion and a second extending portion extending outward therefrom. The body portion of the one or more guide members have one or more shaft receiving portions therein.

18 Claims, 16 Drawing Sheets

(56) References Cited

U.S. PATENT DOCUMENTS

| | | | |
|---|---|---|---|
| 4,594,912 A * | 6/1986 | Ishikawa | F16H 57/02 74/607 |
| 4,658,670 A | 4/1987 | Yasui | |
| 5,067,350 A | 11/1991 | Grillo | |
| 5,540,300 A * | 7/1996 | Downs | F01M 9/06 184/11.2 |
| 5,584,777 A | 12/1996 | Sander | |
| 5,757,084 A | 5/1998 | Wagner | |
| 5,845,546 A * | 12/1998 | Knowles | B60K 23/04 74/650 |
| 6,964,320 B2 | 11/2005 | Metelues | |
| 6,991,574 B2 | 1/2006 | Martin, III | |
| 7,549,940 B2 | 6/2009 | Kira | |
| 8,562,478 B2 | 10/2013 | Groebel | |
| 8,858,381 B2 * | 10/2014 | Trost | F16H 57/0471 475/160 |
| 8,974,342 B2 | 3/2015 | Kwasniewski | |
| 9,267,596 B2 | 2/2016 | Trost | |
| 1,007,274 A1 | 9/2018 | Carr | |
| 10,155,443 B1 | 12/2018 | Farradas | |
| 10,161,502 B2 | 12/2018 | Kwasniewski | |
| 10,167,944 B2 | 1/2019 | Kwasniewski | |
| 2005/0005731 A1 | 1/2005 | Brill | |
| 2006/0199650 A1 | 9/2006 | Schneider | |
| 2018/0045298 A1 * | 2/2018 | Kwasniewski | F16H 57/0483 |

* cited by examiner

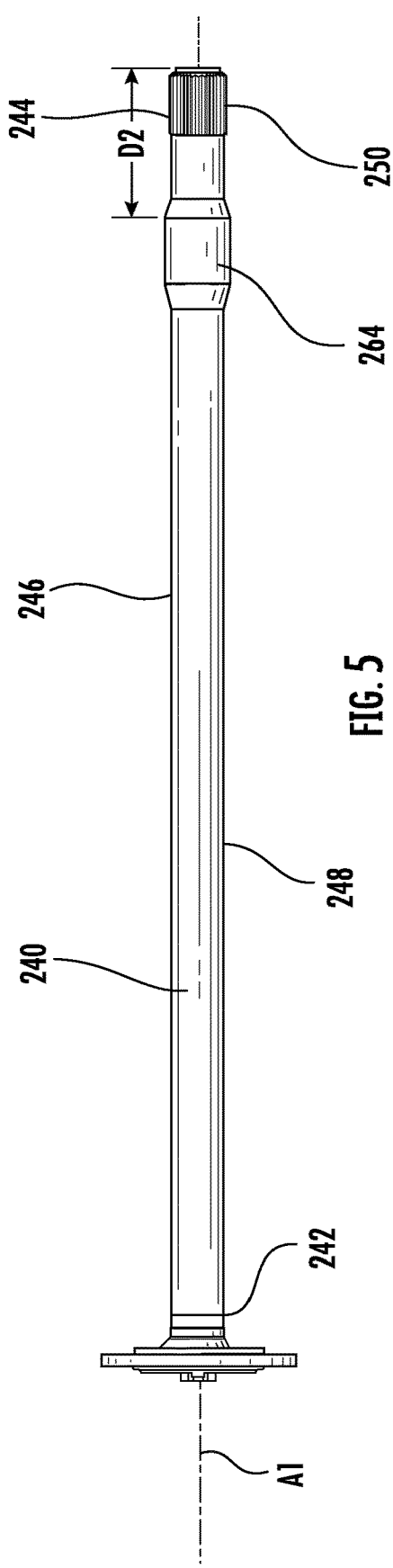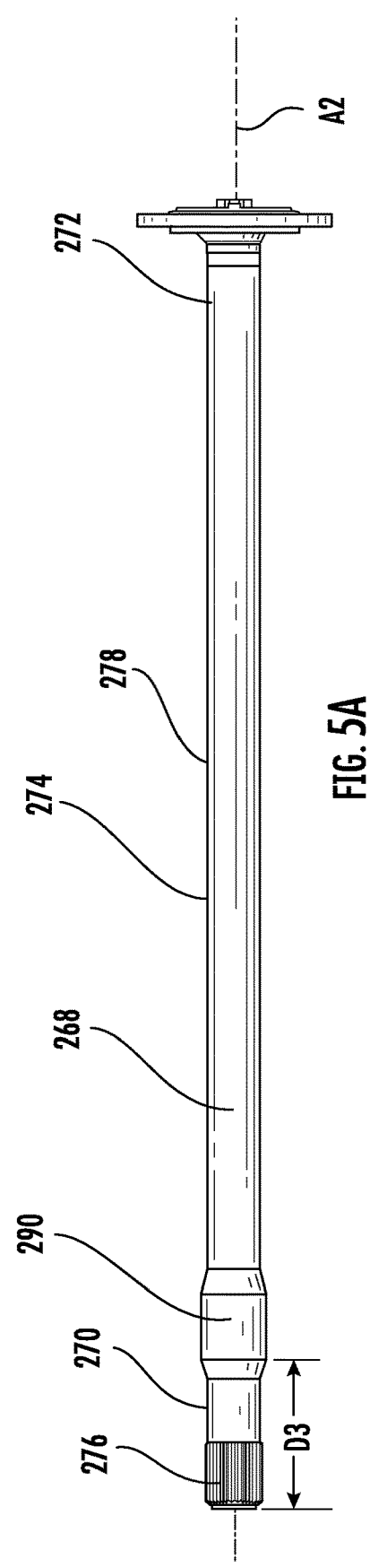

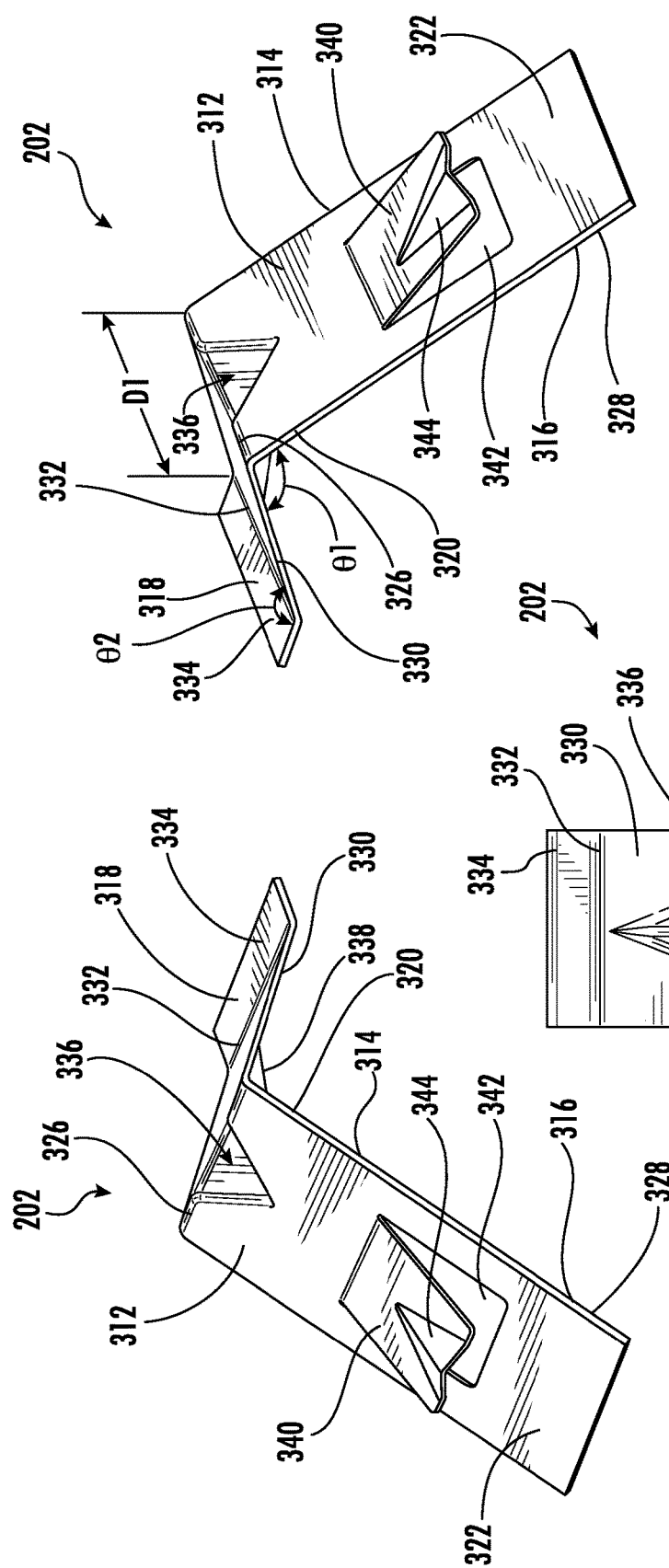
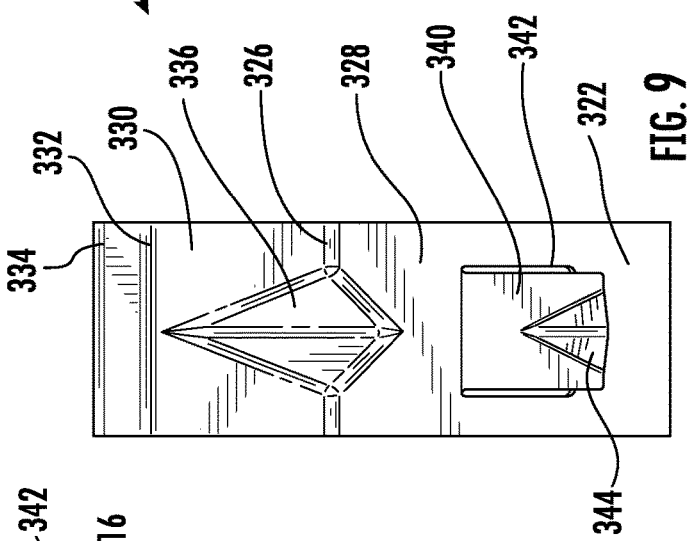
FIG. 7
FIG. 8
FIG. 9

GUIDE MEMBER AND A DRIVE UNIT ASSEMBLY USING THE SAME

CROSS-REFERENCE TO RELATED APPLICATIONS

The present application claims the benefit to U.S. Provisional Patent Application No. 62/844,485 filed on May 7, 2019 and U.S. Provisional Patent Application No. 62/847,518 filed on May 14, 2019, which are incorporated herein by reference in their entirety.

FIELD OF THE DISCLOSURE

The present disclosure relates to an axle assembly for use in a vehicle.

BACKGROUND OF THE DISCLOSURE

An anti-lock braking system (ABS) helps ensure that a vehicle stops effectively and safely without skidding when braking. Anti-lock braking system typically include ABS sensors. The ABS sensors are typically located on the exterior of axle assemblies as a 4-channel ABS brake sensor assembly. This particular arrangement is undesirable as the ABS sensors are exposed and are easily damaged when the vehicle is in operation or being worked on by a mechanic. Additionally, this arrangement is undesirable as the build-up of dirt and/or debris on the ABS sensor assembly and/or exposure of the ABS sensor assembly to the environment and moisture tends to reduce the overall sensitivity of the ABS sensor assembly.

It would therefore be advantageous to develop an axle assembly that is capable of housing at least a portion of the ABS sensor assembly within the housing of the axle assembly. By housing at least a portion of the ABS sensor assembly within the axle housing assembly, the ABS sensor assembly is provided with the protection needed to protect the sensitive components of the ABS sensor assembly from the dirt, debris, and/or moisture of the operational environment of the vehicle. This aids in increasing the overall life and durability of the ABS sensor assembly. Additionally, by incorporating or housing at least a portion of the ABS sensor assembly within the axle assembly, the overall costs associated with the axle assembly and/or the ABS sensor assembly is reduced.

In order to integrate the ABS sensor assembly into an axle assembly, a tone ring needs to be attached to the axle half shaft. This presents many difficulties as the tone ring needs remain undamaged as the axle half shaft is inserted through the tone ring. Additionally, while protecting the tone ring from damage during assembly of the axle half shaft within the axle assembly, the direction and flow of an amount of lubricant within the axle assembly also needs to be managed in order to ensure the various components of the axle assembly are properly lubricated at all timed when the vehicle is in operation.

It would therefore be advantageous to develop an axle assembly that is capable of housing an ABS, while protecting a tone ring from damage during installing axle half shafts. Additionally, it would also be advantageous to efficiently manage and/or direct the flow of an amount of lubricating fluid within an axle half shaft housing of the axle assembly.

SUMMARY OF THE DISCLOSURE

One or more guide members for use within a drive unit assembly of a vehicle. The one or more guide members have a body portion with an outer peripheral surface, a first end portion, a second end portion, and an intermediate portion interposed between the first end portion and second end portion. The intermediate portion of the one or more guide members have a first angularly bent portion defining a first extending portion and a second extending portion extending outward therefrom. The body portion of the one or more guide members have one or more shaft receiving portions therein.

The guide member according to an embodiment of the disclosure, the one or more shaft receiving portions may be disposed within at least a portion of the first angularly bent portion, the first extending portion, and/or the second extending portion of the body portion of the guide member.

The guide member according to any one of the previous embodiments of the disclosure, the one or more shaft receiving portions in the body portion of the guide member may have a size and shape needed to receive at least a portion of an axle half shaft therein.

The guide member according to any one of the previous embodiments of the disclosure, the one or more shaft receiving portions in the body portion of the guide member may aid in centering an end of said axle half shaft relative to a central opening within one or more tone rings to prevent damaging the one or more tone rings.

The guide member according to any one of the previous embodiments of the disclosure, the one or more shaft receiving portions may have a substantially V-shaped cross-sectional shape, a substantially quadrilateral cross-sectional shape, a substantially rectangular cross-sectional shape, a substantially square cross-sectional shape, a substantially circular cross-sectional shape, or a substantially semi-circular cross-sectional shape.

The guide member according to any one of the previous embodiments of the disclosure, the first end portion of the body portion of the guide member may include one or more attachment portions. At least a portion of the one or more attachment portions of the guide member may be connectable to at least a portion of an inner surface of a central body portion of an axle assembly housing.

The guide member according to any one of the previous embodiments of the disclosure, the first extending portion may further include one or more lubricant guide portions and/or one or more lubricant apertures.

The guide member according to any one of the previous embodiments of the disclosure, the one or more lubricant guide portions may be used in order to aid in directing an amount of lubricating fluid from a primary sump within a central body portion of an axle assembly housing to one or more secondary sumps within a first axle half shaft housing and/or a second axle half shaft housing of the axle assembly housing. The one or more lubricant apertures may allow the passage of an amount of the lubricating fluid from the primary sump into the one or more secondary sumps.

The guide member according to any one of the previous embodiments of the disclosure, the one or more lubricant guide portions may include one or more lubricant collection portions. It is within the scope of this disclosure that the one or more lubricant collection portions may be used in order to aid in collecting an amount of the lubricating fluid expelled from the primary sump.

The guide member according to any one of the previous embodiments of the disclosure, the one or more shaft receiving portions may have a bottom portion. At least a portion of the bottom portion of the one or more shaft receiving portions in the body portion of the guide member may extend at an angle relative to a rotational axis of an axle half shaft allowing an amount of the lubricating fluid to transition from the one or more secondary sumps into the primary sump.

The guide member according to any one of the previous embodiments of the disclosure, the one or more lubricant guide portions may be disposed proximate to a ring gear and/or a differential case of a differential assembly.

The guide member according to any one of the previous embodiments of the disclosure, the one or more lubricant guide portions extend outward from at least a portion of the one or more lubricant apertures.

The guide member according to any one of the previous embodiments of the disclosure, the second end portion of the body portion of the guide member may include a second angularly bent portion. At least a portion of the second extending portion and a third extending portion may extend outward away from the second angularly bent portion of the body portion of the guide member.

The guide member according to any one of the previous embodiments of the disclosure, at least a portion of the second extending portion, the third extending portion, and/or the second angularly bent portion of the guide member may be disposed within at least a portion of a first axle half shaft housing or a second axle half shaft housing of an axle assembly housing.

The guide member according to any one of the previous embodiments of the disclosure, an angle θ1 may exist between the first extending portion and the second extending portion of the body portion of the guide member and an angle θ2 may exist between the second extending portion and the third extending portion of the body portion of the guide member.

The guide member according to any one of the previous embodiments of the disclosure, the angle θ1 may be less than the angle θ2.

The guide member according to any one of the previous embodiments of the disclosure, the guide member may include one or more vibration reduction members that are connected to at least a portion of the second extending portion, the third extending, and/or the second angularly bent portion of the body portion of the guide member.

The guide member according to any one of the previous embodiments of the disclosure, the guide member may include one or more vibration reduction member retention portions that are disposed within the third extending portion of the body portion of the guide member. The one or more vibration reduction member retention portions may have a size and shape to receive and/or retain at least a portion of the one or more vibration reduction members therein.

The guide member according to any one of the previous embodiments of the disclosure, at least a portion of the second extending portion and/or the third extending portion of the body portion of the guide member may form at least a portion of a secondary sump disposed within a first axle half shaft housing or a second axle half shaft housing of an axle assembly housing.

The guide member according to any one of the previous embodiments of the disclosure, the one or more shaft receiving portions may engage an increased diameter portion of an axle half shaft to center an end of the axle half shaft relative to a central opening within one or more tone rings to prevent damaging the one or more tone rings.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 5 is a schematic side view of an axle half shaft for use with the drive unit assembly according to the embodiment illustrated in FIGS. 3 and 4 of the disclosure;

FIG. 5A is a schematic side view of another axle half shaft for use with the drive unit assembly according to the embodiment illustrated in FIGS. 3 and 4 of the disclosure;

FIG. 7 is a schematic perspective view of the one or more guide members illustrated in FIG. 6 of the disclosure;

FIG. 8 is a schematic perspective view of the one or more guide members according to the embodiment illustrated in FIGS. 6 and 7 of the disclosure;

FIG. 9 is a schematic top plan view of the one or more guide members according to the embodiment illustrated in FIGS. 6-8 of the disclosure;

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the axle assembly disclosed herein may be used in automotive, off-road vehicle, all-terrain vehicle, construction, structural, marine, aerospace, locomotive, military, machinery, robotic and/or consumer product applications. Additionally, as a non-limiting example, the axle assembly disclosed herein may also be used in passenger vehicle, electric vehicle, hybrid vehicle, commercial vehicle, autonomous vehicles, semi-autonomous vehicles and/or heavy vehicle applications.

Figure 1:
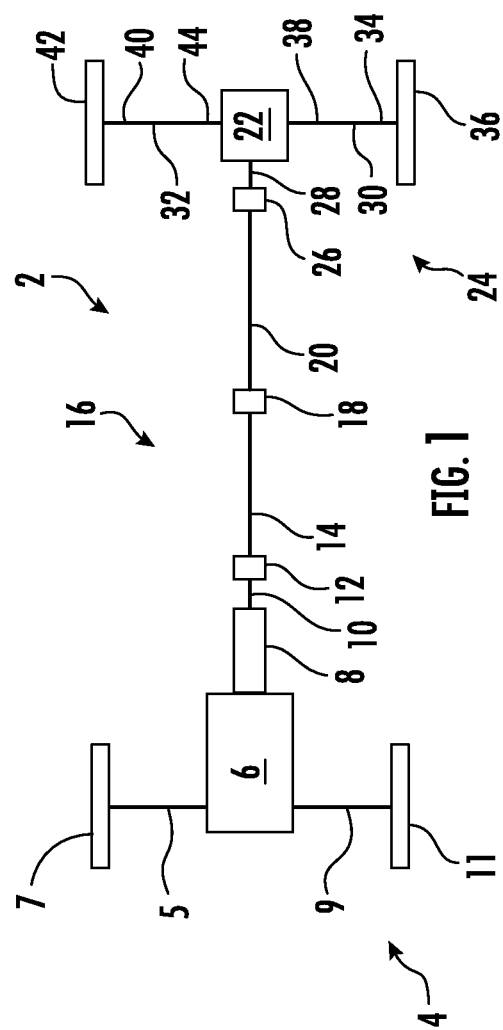
FIG. 1 is a schematic top-plan view of a vehicle having one or more shaft guides according to an embodiment of the disclosure.

FIG. 1 is a schematic top-plan view of a vehicle 2 having a front axle assembly 4 and a rear axle assembly 24 according to an embodiment of the disclosure. As illustrated in FIG. 1 and as a non-limiting example, the front axle assembly 4 may include a first axle half shaft 5 that is drivingly connected to at least a portion of a first front axle wheel assembly 7 and a second axle half shaft 9 that is drivingly connected to at least a portion of a second front axle wheel assembly 11. It is within the scope of this disclosure that the front axle assembly 4 may receive an amount of rotational power from an engine 6 or may be un-powered.

In accordance with the embodiment illustrated in FIG. 1 and as a non-limiting example, the engine 6 of the vehicle may be drivingly connected to an end of a transmission 8. A transmission output shaft 10 is drivingly connected to an end of the transmission 8 opposite the engine 6. The transmission 8 is a power management system which provides controlled application of the rotational power generated by the engine 6 by means of a gear box.

An end of the transmission output shaft 10 opposite the transmission 8 is drivingly connected to an end of a first joint assembly 12. The first joint assembly 12 is a joint or coupling assembly that allows rotational energy to be transferred between shafts having a variable axis. Drivingly connected to an end of the first joint assembly 12, opposite the transmission output shaft 10, is a first shaft 14. It is within the scope of this disclosure and as a non-limiting example that the first shaft 14 may be a propeller shaft, a drive shaft, a cardan shaft, a double cardan shaft, a universal joint shaft, a Hooke's joint shaft or any other shaft in a drivetrain assembly 16 that is used to transmit the rotational energy generated by the engine 6 to the drive wheel(s) of the vehicle 2. An end of the first shaft 14, opposite the first joint assembly 12, may be drivingly connected to a second joint assembly 18.

Drivingly connected to an end of the second joint assembly 18, opposite the first shaft 14, is an end of a second shaft 20 of the drivetrain assembly 16 of the vehicle 2. It is within the scope of this disclosure and as a non-limiting example that the second shaft 20 may be a propeller shaft, a drive shaft, a cardan shaft, a double cardan shaft, a universal joint shaft, a Hooke's joint shaft or any other shaft in a drivetrain assembly 16 that is used to transmit the rotational energy generated by the engine 6 to the drive wheel(s) of the vehicle 2. An end of the second shaft 20, opposite the second joint assembly 18, may be drivingly connected to at least a portion of a rear axle differential assembly 22 of the rear axle system 24 of the vehicle 2. The rear axle differential assembly 22 is a set of gears that allows the outer drive wheel(s) to rotate at a faster rate than the inner drive wheel(s) of the vehicle 2.

According to an embodiment of the disclosure and as a non-limiting example, at least a portion of the end of the second shaft 20, opposite the second joint assembly 18, may be drivingly connected to a third joint assembly 26 which in turn is drivingly connected to at least a portion of the rear axle differential assembly 22 of the vehicle 2. As illustrated in FIG. 1 of the disclosure and as a non-limiting example, at least a portion of an end of a third shaft 28 may drivingly connect an end of the third joint assembly 26, opposite the second shaft 20. Additionally, as illustrated in FIG. 1 of the disclosure and as a non-limiting example, at least a portion of an end of the third shaft 28, opposite the third joint assembly 26, may be drivingly connected to at least a portion of the rear axle differential assembly 22 of the vehicle 100. It is within the scope of this disclosure and as a non-limiting example that the third shaft 28 may be a differential input shaft, a rear axle system input shaft, a pinion gear shaft or any other type of shaft that provides an amount of rotational power to the rear axle differential assembly 22 of the vehicle 2.

The rear axle system 24 of the vehicle 2 further includes a first rear axle half shaft 30 and a second rear axle half shaft 32. The first rear axle half shaft 30 extends substantially perpendicular to the third shaft 28. At least a portion of a first end portion 34 of the first rear axle half shaft 30 may be drivingly connected to at least a portion of a first rear axle wheel end assembly 36 and at least a portion of a second end portion 38 of the first rear axle half shaft 30 may be drivingly connected to a side of the rear axle differential assembly 22.

Extending substantially perpendicular to the third shaft 28 is the second rear axle half shaft 32 of the vehicle 2. At least a portion of a first end portion 40 of the second rear axle half shaft 32 may be drivingly connected to at least a portion of a second rear axle wheel end assembly 42. Additionally, at least a portion of a second end portion 44 of the second rear axle half shaft 32 may be drivingly connected to an end of the rear axle differential assembly 22, opposite the first rear axle half shaft 30 of the vehicle 2.

It is within the scope of this disclosure and as a non-limiting example that the front axle assembly 4 and/or the rear axle assembly 24 of the vehicle 2 may include the use of one or more shaft guides according to an embodiment of the disclosure.

Figure 2:
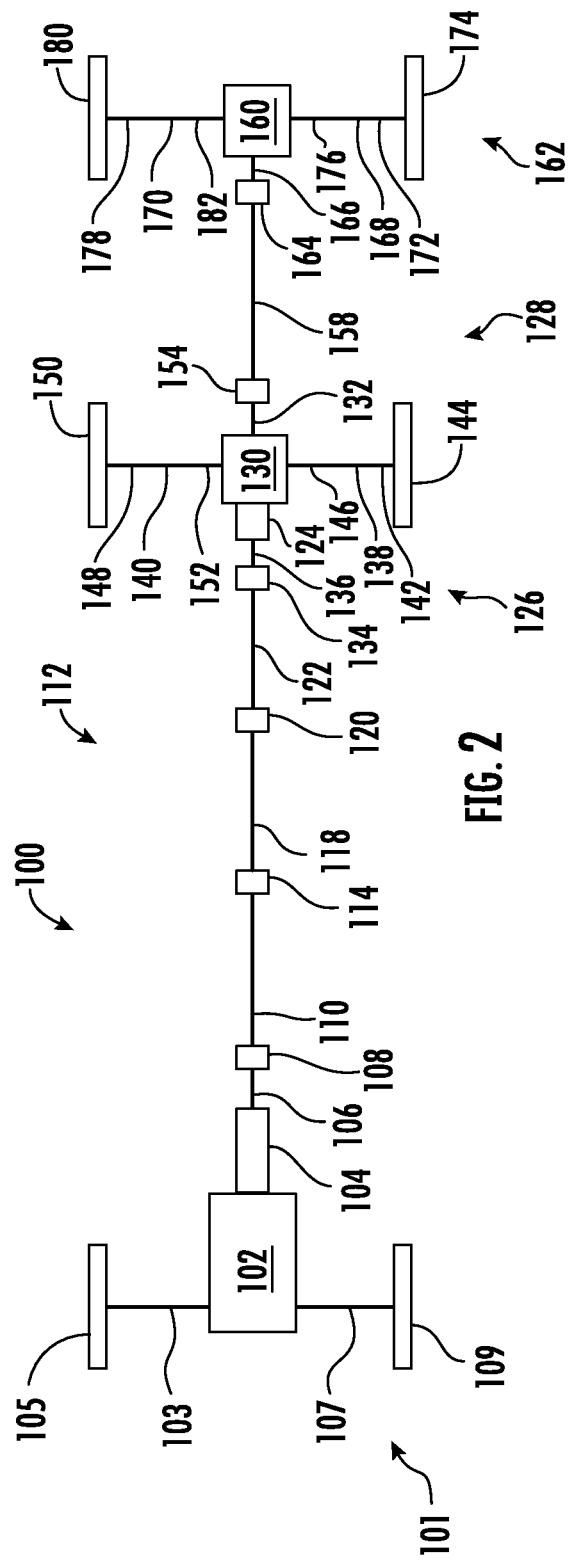
FIG. 2 is a schematic top-plan view of another vehicle having one or more shaft guides according to an embodiment of the disclosure.

FIG. 2 is a schematic top-plan view of another vehicle 100 having a front axle assembly 101, a forward tandem axle system 126, and a rear tandem axle system 162. As illustrated in FIG. 2 and as a non-limiting example, the front axle assembly 101 may include a first axle half shaft 103 that is drivingly connected to at least a portion of a first front axle wheel assembly 105 and a second axle half shaft 107 that is drivingly connected to at least a portion of a second front axle wheel assembly 109. It is within the scope of this disclosure that the front axle assembly 101 may receive an amount of rotational power from an engine 102 or may be un-powered.

In accordance with the embodiment illustrated in FIG. 2 and as a non-limiting example, the engine 102 of the vehicle 100 may be drivingly connected to an end of a transmission 104. A transmission output shaft 106 is drivingly connected to an end of the transmission 104, opposite the engine 102. The transmission 104 is a power management system which provides controlled application of the rotational power generated by the engine 102 by means of a gear box.

At least a portion of an end of the transmission output shaft 106, opposite the transmission 104, may be drivingly connected to an end of a first joint assembly 108. The universal joint assembly 108 is a joint or coupling assembly that allows rotational energy to be transferred between shafts having a variable axis. Drivingly connected to an end of the first joint assembly 108, opposite the transmission output shaft 106, is an end of a first shaft 110. It is within the scope of this disclosure and as a non-limiting example that the first shaft 110 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the first shaft 110, opposite the first joint assembly 108, may be drivingly connected to a second joint assembly 114 of the vehicle 100.

Drivingly connected to an end of the second joint assembly 114, opposite the first shaft 110, is an end of a second shaft 118 of the drivetrain assembly 112 of the vehicle 100. It is within the scope of this disclosure and as a non-limiting example that the second shaft 118 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the second shaft 118, opposite the second joint assembly 114, may be drivingly connected to at least a portion of a third joint assembly 120.

At least a portion of an end of the third joint assembly 120 is drivingly connected to an end of a third shaft 122. It is within the scope of this disclosure and as a non-limiting example that the third shaft 122 may be a drive shaft, a propeller shaft or a prop shaft. An end of the third shaft 122, opposite the third joint assembly 120, may be drivingly connected to at least a portion of an inter-axle differential assembly 124 of a forward tandem axle system 126 of a rear tandem axle system 128 of the vehicle 100. The inter-axle differential assembly 124 is a device that divides the rotational power generated by the engine 102 between the axles in the vehicle 100.

According to an embodiment of the disclosure and as a non-limiting example, at least a portion of the end of the third shaft 122, opposite the third joint assembly 120, may be drivingly connected to a fourth joint assembly 134 which in turn is drivingly connected to at least a portion of the inter-axle differential assembly 124 of the vehicle 100. As illustrated in FIG. 2 of the disclosure and as a non-limiting example, at least a portion of an end of a fourth shaft 136 may drivingly connected to at least a portion of an end of the fourth joint assembly 134, opposite the third shaft 122. Additionally, as illustrated in FIG. 2 of the disclosure and as a non-limiting example, at least a portion of an end of the fourth shaft 136, opposite the fourth joint assembly 134, may be drivingly connected to at least a portion of the inter-axle differential assembly 124 of the vehicle 100. It is within the scope of this disclosure and as a non-limiting example that the fourth shaft 136 may be an inter-axle differential input shaft, a differential input shaft, a forward tandem axle system input shaft, a pinion gear shaft or any other type of shaft that provides an amount of rotational power to the inter-axle differential assembly 124 and the forward tandem axle differential assembly 130 of the vehicle 100.

In accordance with the embodiment illustrated in FIG. 2 and as a non-limiting example, the forward tandem axle system 126 further includes a first forward tandem axle half shaft 138 and a second forward tandem axle half shaft 140. At least a portion of a first end portion 142 of the first forward tandem axle half shaft 138 may be drivingly connected to at least a portion of a first forward tandem axle wheel end assembly 144 and at least a portion of a second end portion 146 of the first forward tandem axle half shaft 138 may be drivingly connected to a side of the forward tandem axle differential assembly 130 of the vehicle 100.

Extending substantially perpendicular to the fourth shaft 136 is the second forward tandem axle half shaft 140 of the vehicle 100. At least a portion of a first end portion 148 of the second forward tandem axle half shaft 140 may be drivingly connected to at least a portion of a second forward tandem axle wheel end assembly 150. Additionally, at least a portion of a second end portion 152 of the second forward tandem axle half shaft 140 may be drivingly connected to an end of the forward tandem axle differential assembly 130, opposite the first forward tandem axle half shaft 138 of the vehicle 100.

At least a portion of an end of the forward tandem axle system output shaft 132 is drivingly connected to a side of the inter-axle differential assembly 124, opposite the fourth shaft 136. Drivingly connected to at least a portion of an end of the forward tandem axle system output shaft 132, opposite the inter-axle differential assembly 124, is a fifth joint assembly 154. At least a portion of an end of the fifth joint assembly 154, opposite forward tandem axle system output shaft 132, may be drivingly connected to at least a portion of an end of a fifth shaft 158 of the drivetrain assembly 112. It is within the scope of this disclosure and as a non-limiting example that the fifth shaft 158 may be a propeller shaft, a drive shaft, a cardan shaft, a double cardan shaft, a universal joint shaft, a Hooke's joint shaft or any other shaft in a drivetrain assembly 112 that is used to transmit the rotational energy generated by the engine 102 to the drive wheel(s) of the vehicle 100. An end of the fifth shaft 158, opposite the fifth joint assembly 154, may be drivingly connected to at least a portion of a rear tandem axle differential assembly 160 of a rear tandem axle system 162 of the rear tandem axle system 128 of the vehicle 100. The rear tandem axle differential assembly 160 is a set of gears that allows the outer drive wheel(s) to rotate at a faster rate than the inner drive wheel(s) of the vehicle 100.

In accordance with an embodiment of the disclosure and as a non-limiting example, at least a portion of the end of the fifth shaft 158, opposite the fifth joint assembly 154, may be drivingly connected to a sixth joint assembly 164 which in turn is drivingly connected to at least a portion of the rear tandem axle differential assembly 160 of the vehicle 100. As illustrated in FIG. 2 of the disclosure and as a non-limiting example, at least a portion of an end of a sixth shaft 166 may drivingly connected to at least a portion of an end of the sixth joint assembly 164, opposite the fifth shaft 158. Additionally, as illustrated in FIG. 2 and as a non-limiting example, at least a portion of an end of the sixth shaft 166, opposite the sixth joint assembly 166, may be drivingly connected to at least a portion of the rear tandem axle differential assembly 160 of the vehicle 100. It is within the scope of this disclosure and as a non-limiting example that the sixth shaft 166 may be a differential input shaft, a rear tandem axle system input shaft, a pinion gear shaft or any other type of shaft that provides an amount of rotational power to the rear tandem axle differential assembly 160 of the vehicle 100.

The rear tandem axle system 162 of the vehicle 100 further includes a first rear tandem axle half shaft 168 and a second rear tandem axle half shaft 170. The first rear tandem axle half shaft 168 extends substantially perpendicular to the sixth shaft 166. At least a portion of a first end portion 172 of the first rear tandem axle half shaft 168 may be drivingly connected to at least a portion of a first rear tandem axle wheel end assembly 174 and at least a portion of a second end portion 176 of the first rear tandem axle half shaft 168 may be drivingly connected to a side of the rear tandem axle differential assembly 160.

Extending substantially perpendicular to the sixth shaft 166 is the second rear tandem axle half shaft 170 of the vehicle 100. At least a portion of a first end portion 178 of the second rear tandem axle half shaft 170 may be drivingly connected to at least a portion of a second rear tandem axle wheel end assembly 180. Additionally, at least a portion of a second end portion 182 of the second rear tandem axle half shaft 170 may be drivingly connected to an end of the rear tandem axle differential assembly 160, opposite the first rear tandem axle half shaft 168 of the vehicle 100.

It is within the scope of this disclosure and as a non-limiting example that the front axle assembly 101, the forward tandem axle system 126, and/or the rear tandem axle system 162 may include one or more shaft guides according to an embodiment of the disclosure.

Figure 3:
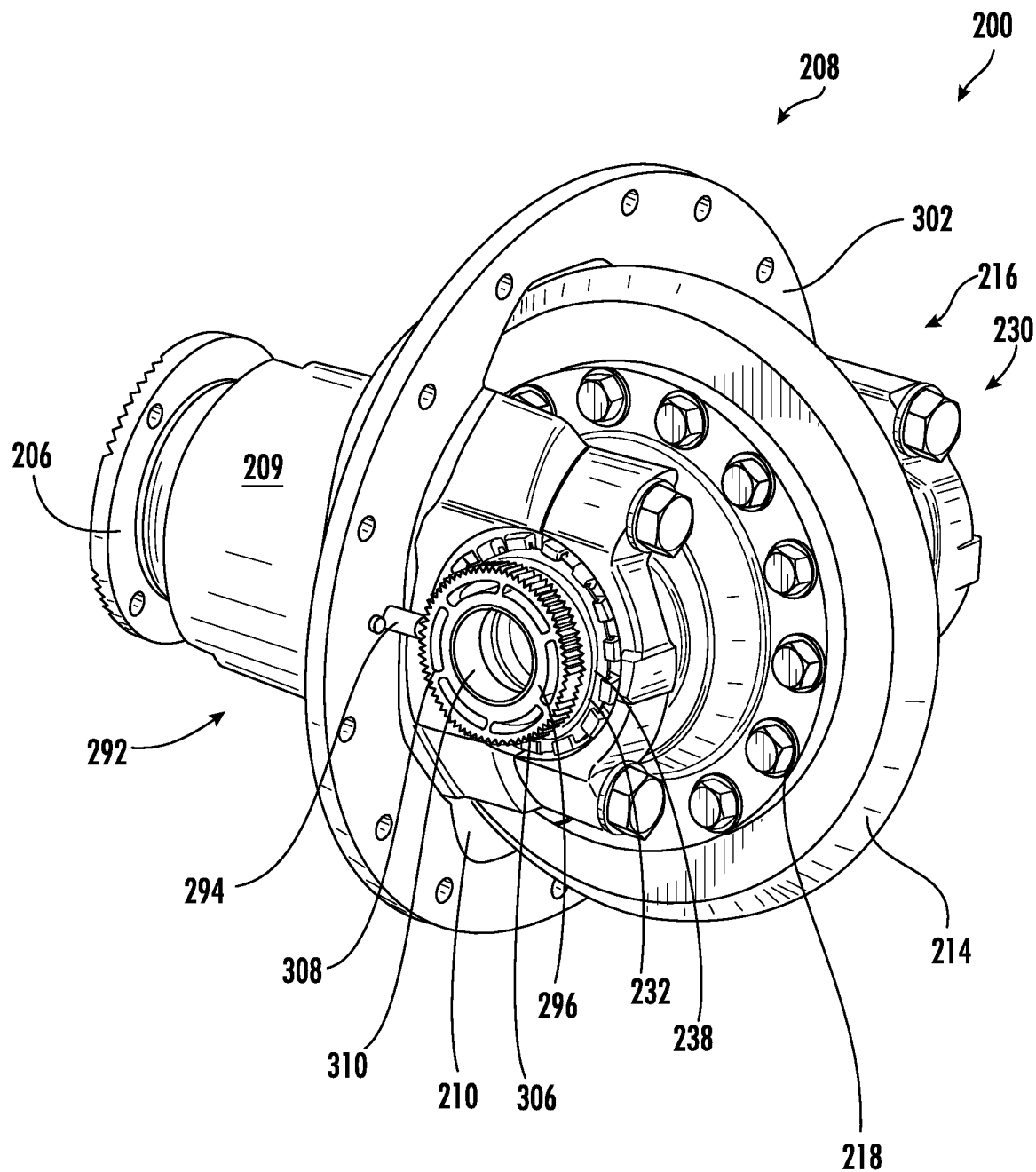
FIG. 3 is a schematic perspective view of a portion of a drive unit assembly according to an embodiment of the disclosure.
Figure 4:
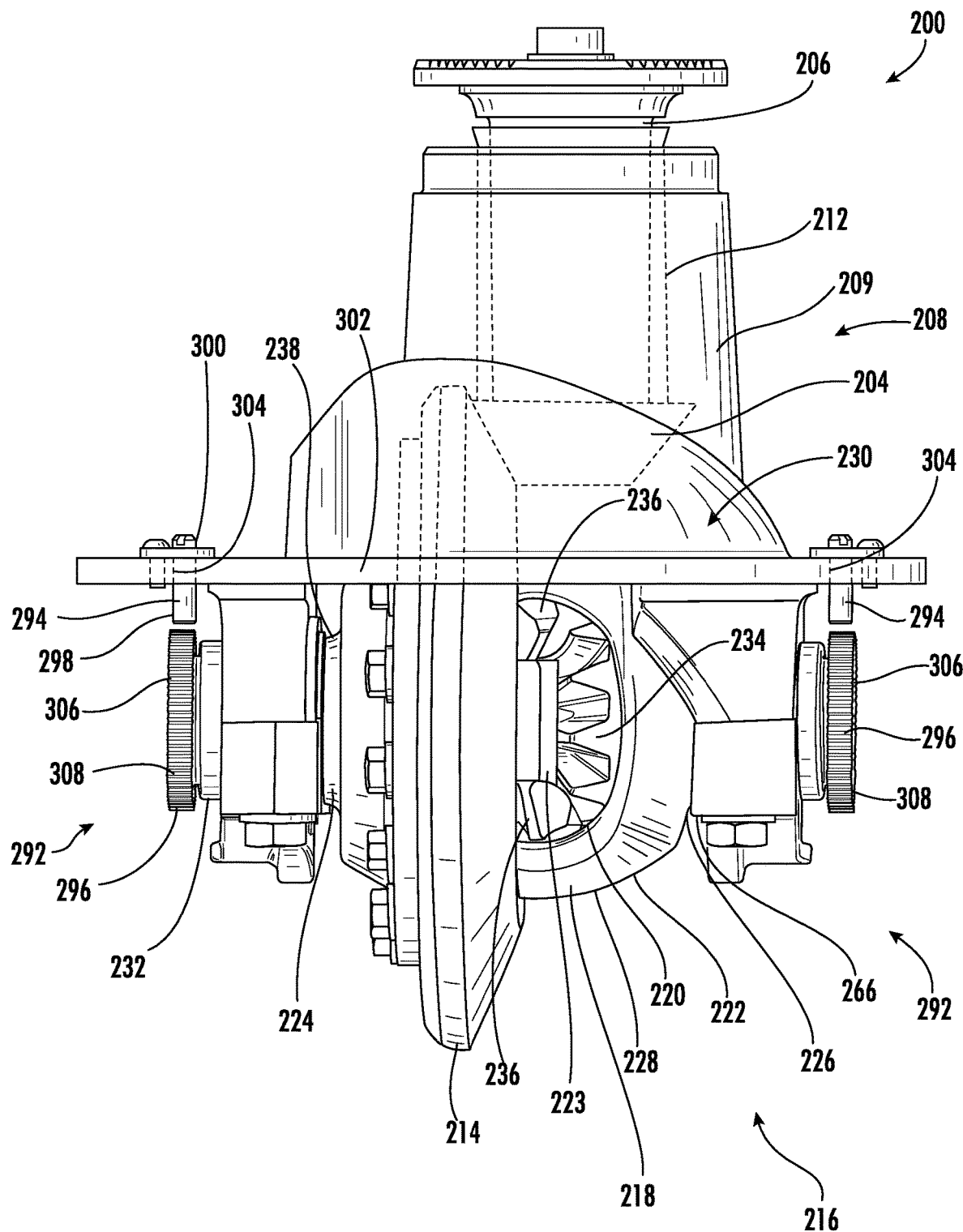
FIG. 4 is a schematic top plan view of a portion of the drive unit assembly according to the embodiment illustrated in FIG. 3 of the disclosure.
Figure 6:
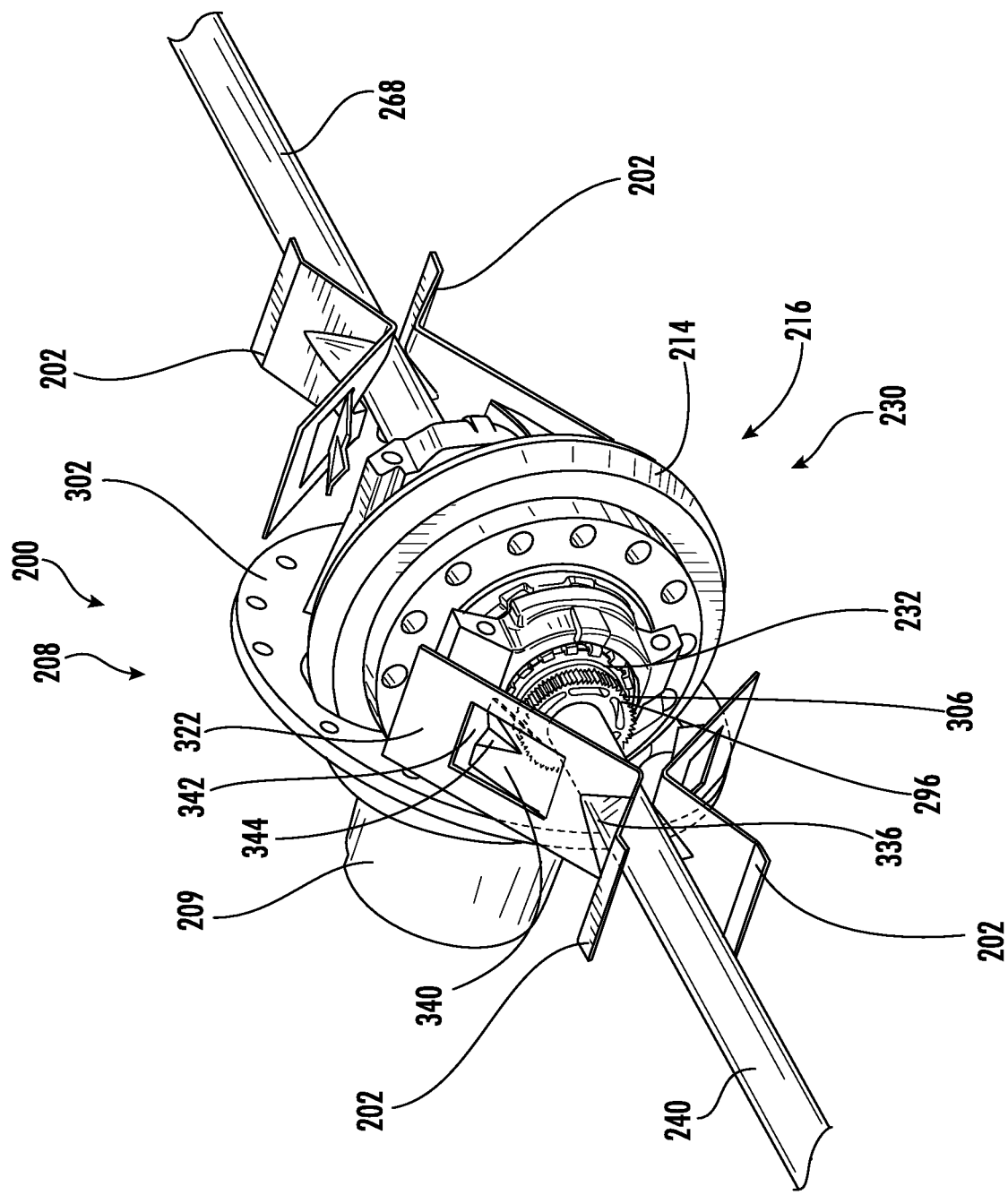
FIG. 6 is a schematic perspective view of a portion of the drive unit assembly according to the embodiment illustrated in FIGS. 3-5 having one or more guide members.
Figure 10:
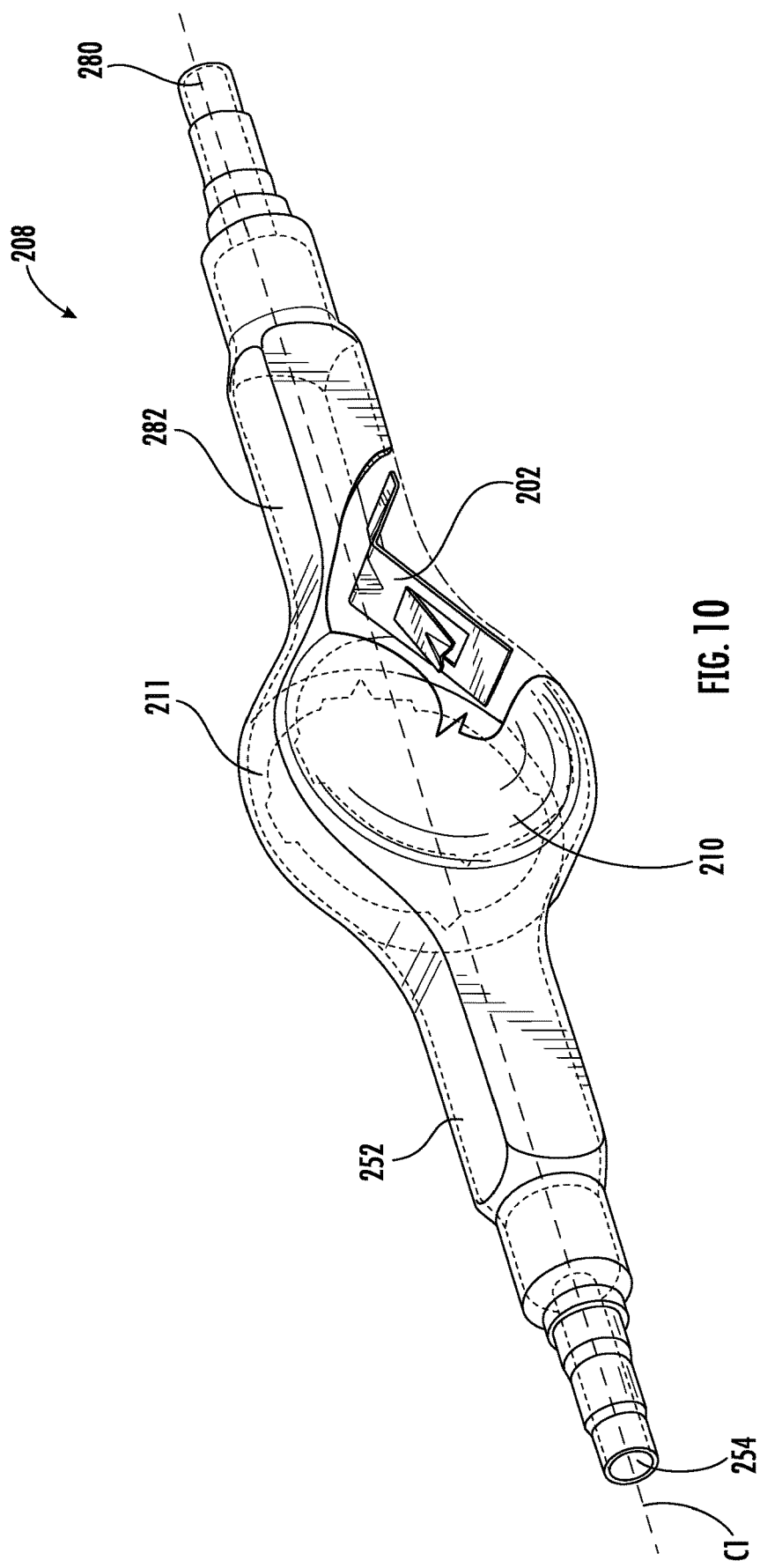
FIG. 10 is a schematic perspective view of an axle housing according to an embodiment of the disclosure having the one or more guide members illustrated in FIGS. 6-9 therein.
Figure 11:
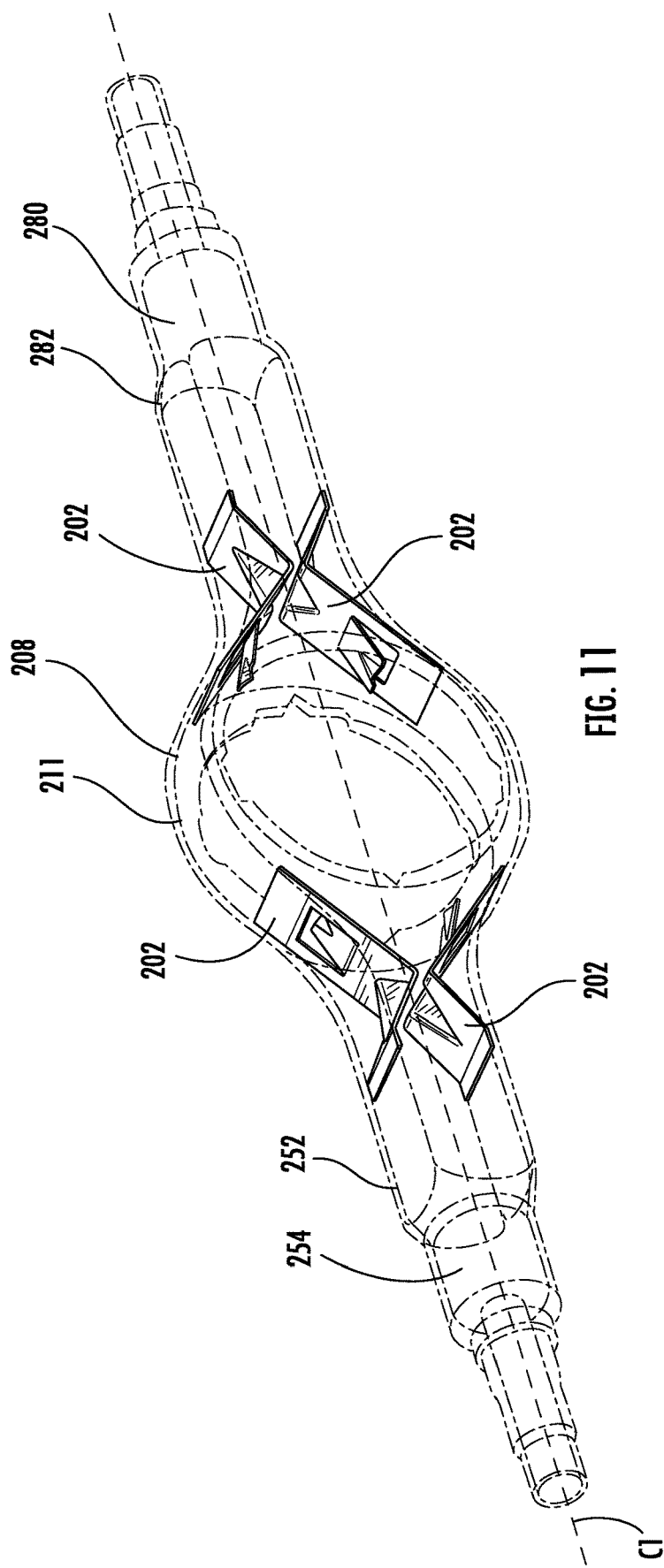
FIG. 11 is a schematic perspective view of an axle housing illustrated in FIG. 10 of the disclosure having the one or more guide members illustrated in FIGS. 6-9 therein.

FIGS. 3-13 provide a schematic illustration of a drive unit assembly 200 having one or more guide members 202 therein. As best seen in FIGS. 3 and 4 of the disclosure and as a non-limiting example, the drive unit assembly 200 includes a pinion gear 204 having a pinion gear shaft 206. At least a portion of the pinion gear shaft 206 extends from outside an axle assembly housing 208 and into a hollow interior portion 210 of the axle assembly housing 208 through a pinion gear shaft receiving aperture 212. It is within the scope of this disclosure and as a non-limiting example that the drive unit assembly 200 may be a front axle drive unit assembly, a rear axle drive unit assembly, a forward tandem axle drive unit assembly, and/or a rear tandem axle drive unit assembly.

In accordance with the embodiment illustrated in FIGS. 3 and 4 of the disclosure and as a non-limiting example, the axle assembly housing may include a first member 209. The first member 209 of the axle assembly housing 208 may be a separate component that is selectively connectable to at least a portion of a central body portion 211 of the axle assembly housing 208. It is within the scope of this disclosure and as a non-limiting example that the first member 209 of the axle assembly housing 208 may be integrally connected to at least a portion of the central body portion 211 of the axle assembly housing 208 by using one or more welds, one or more mechanical fasteners, one or more adhesives, and/or a threaded connection.

Drivingly connected to at least a portion of the pinion gear 204 is a ring gear 214 of a differential assembly 216. As a result, it is therefore to be understood that the rotational power needed to drive the differential assembly 216 is transmitted from the motor (not shown), through the pinion gear 204, and to the ring gear 214. At least a portion of the ring gear 214 is drivingly connected to at least a portion of a differential case 218 of the differential assembly 216. It is within the scope of this disclosure and as a non-limiting example that the motor (not shown) may be an internal combustion engine, a turbine, an electric motor, or any other similar device that is capable of generating an amount of rotational energy. Additionally, it is within the scope of this disclosure and as a non-limiting example that the ring gear 214 of the differential assembly 216 may be integrally connected to at least a portion of the differential case 218 by using one or more welds, one or more mechanical fasteners, one or more adhesives, a spline connection, and/or a threaded connection.

According to an embodiment of the disclosure and as a non-limiting example, the differential case may be a single piece component or a multi-piece component that is integrally connected to or integrally formed as part of the ring gear 214 of the differential assembly 216.

As best seen in FIG. 4 of the disclosure and as a non-limiting example, the differential case 218 have an inner surface 220, an outer surface 222, a hollow interior portion 223, a first end portion 224, a second end portion 226, and an intermediate portion 228 interposed between the first and second end portions 222 and 224 of the differential case 218. The hollow interior portion 223 of the differential case 218 may be of a size and shape to receive and/or retain at least a portion of a differential gear set 230 therein. It is within the scope of this disclosure and as a non-limiting example that the differential gear set 230 may include a first side gear 232, a second side gear 234, and one or more pinion gears 236. At least a portion of the one or more pinion gears 236 of the differential gear set 230 may be meshingly engaged with and drivingly connected to at least a portion of the first side gear 232 and the second side gear 234 of the differential gear set 230.

Extending outward from at least a portion of the first end portion 224 of the differential case 218 is first outwardly extending portion 238. The first outwardly extending portion 238 of the differential case 218 may be of a size and shape to receive and/or retain at least a portion of the first side gear 232 of the differential gear set 230 and/or at least a portion of an end of a first axle half shaft 240 of the drive unit assembly 200. The first axle half shaft 240 may be of a size and shape needed to transmit the rotational power from the differential assembly 216 to one or more first wheel assemblies (not shown).

According to the embodiment illustrated in FIG. 5 and as a non-limiting example, the first axle half shaft 240 may have a first end portion 242, a second end portion 244, and an intermediate portion 246 interposed between the first and second end portions 243 and 244 of the first axle half shaft 240. At least a portion of the first end portion 242 of the first axle half shaft 240 may be drivingly connected to at least a portion of the one or more first wheel assemblies (not shown). At least a portion of the second end portion 244 of the first axle half shaft 240 may be drivingly connected to at least a portion of the first side gear 232 of the differential gear set 230 of the differential assembly 216.

In accordance with the embodiment illustrated in FIG. 5 and as a non-limiting example, the second end portion 244 of the first axle half shaft 240 may be spliningly connected to at least a portion of the first side gear 232 of the differential gear set 230. According to this embodiment of the disclosure, a plurality of splines 250 may circumferentially extend along at least a portion of an outer surface 248 of the second end portion 244 of the first axle half shaft 240. The plurality of splines 250 of the first axle half shaft 240 are complementary to and meshingly engaged with at least a portion of a plurality of splines (not shown) of the first side gear 232 of the differential gear set 230.

Figure 12:
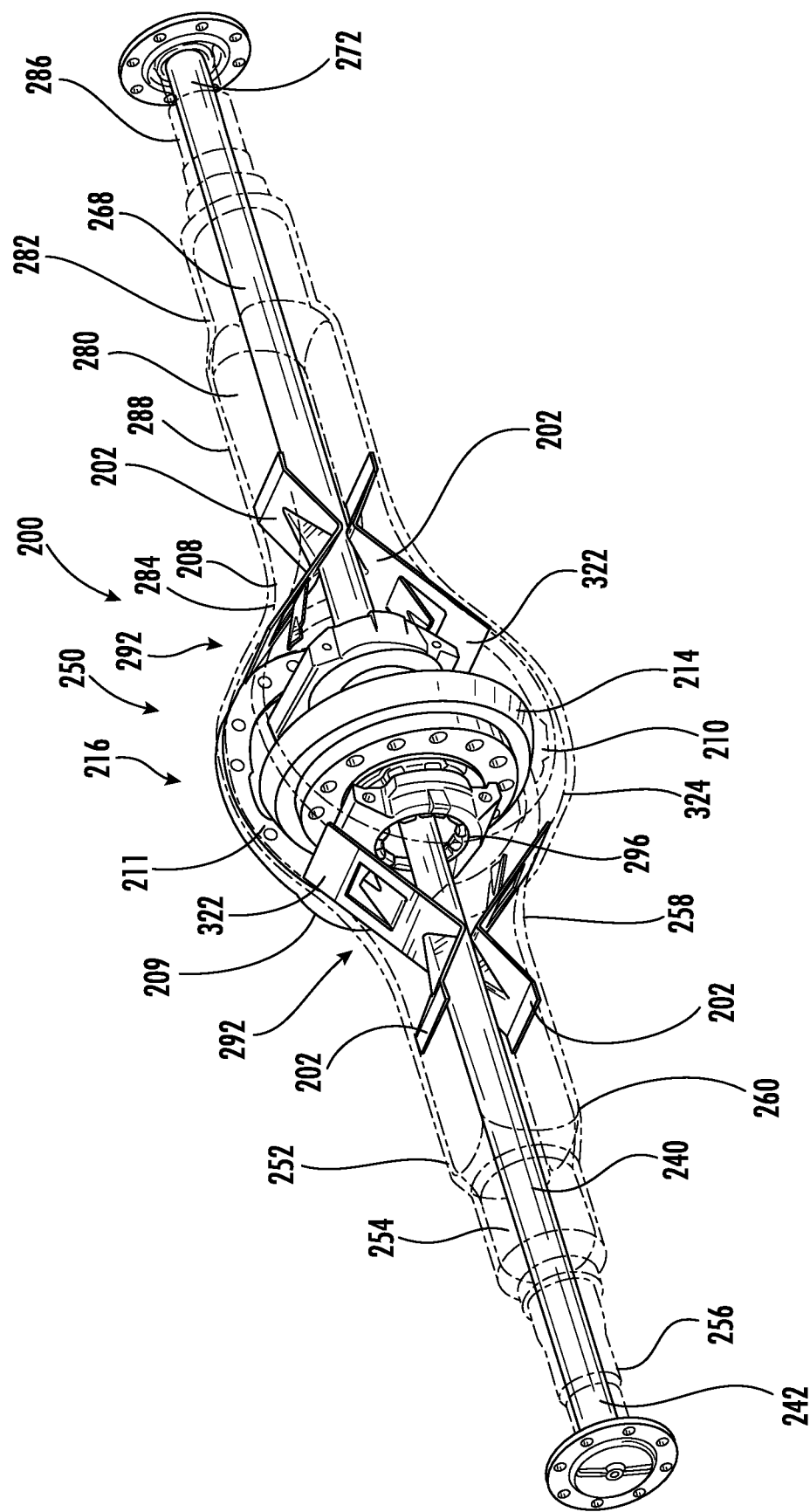
FIG. 12 is a schematic perspective view of an axle housing illustrated in FIGS. 10 and 11 having the drive unit assembly and the one or more guide members illustrated in FIGS. 3-9 therein.
Figure 13:
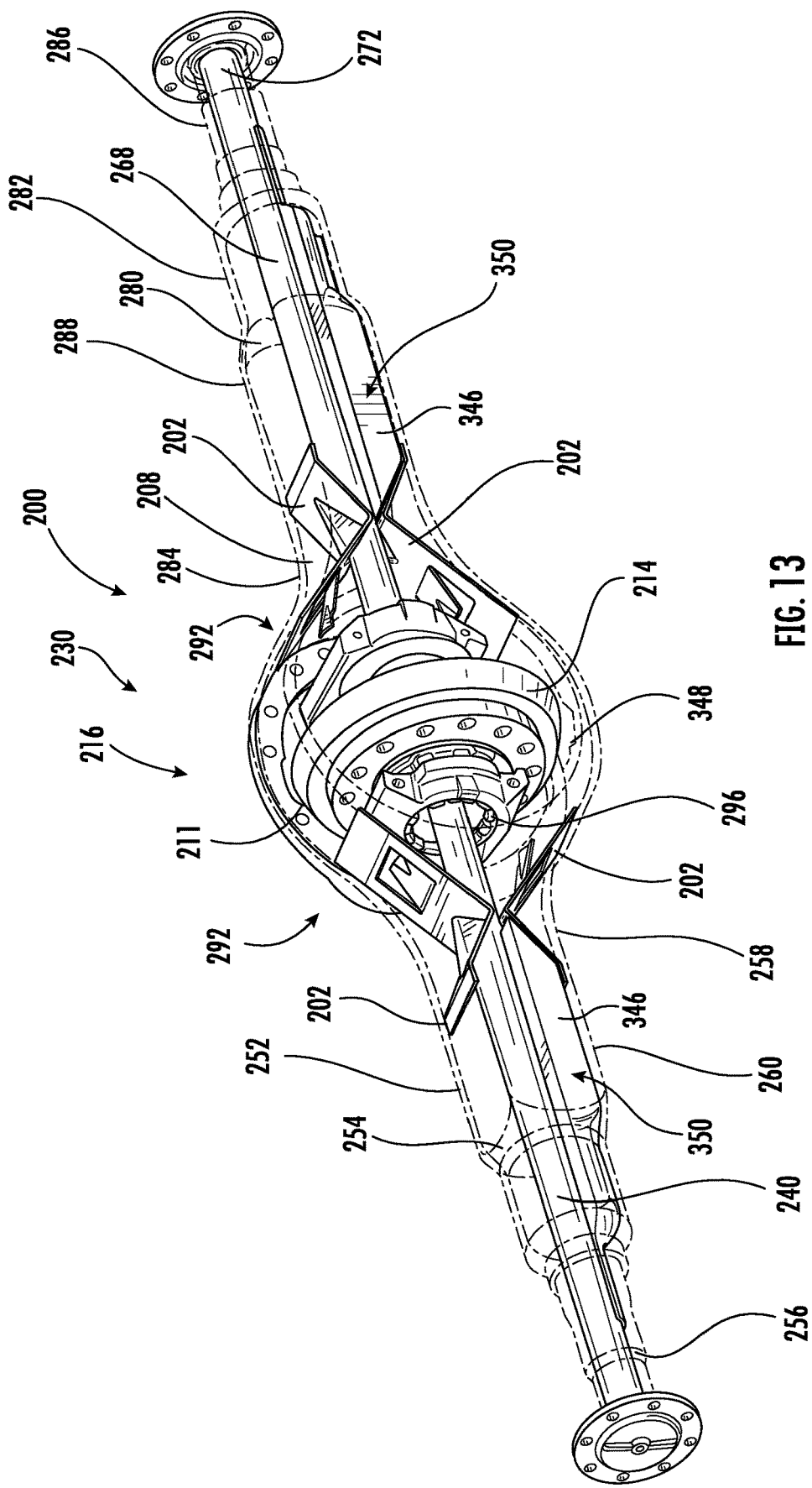
FIG. 13 is a schematic perspective view of an axle housing illustrated in FIGS. 10-12 having the drive unit assembly and the one or more guide members illustrated in FIGS. 3-9 therein.

As best seen in FIGS. 12 and 13 of the disclosure and as a non-limiting example, at least a portion of the first axle half shaft 240 may be received and/or retained within at least a portion of a first axle half shaft receiving portion 254 of a first axle half shaft housing 252 of the axle assembly housing 208 of the drive unit assembly 200. The first axle half shaft housing 252 of the axle assembly housing 208 has a first end portion 256, a second end portion 258, and an intermediate portion 260 interposed between the first and second end portions 256 and 258 of the first axle half shaft housing 252. At least a portion of the first end portion 242 of the first axle half shaft 240 may be disposed outward from at least a portion of the first end portion 256 of the first axle half shaft housing 252. At least a portion of the second end portion 258 of the first axle half shaft housing 252 may extend outward from an end of the central body portion 211 of the axle assembly housing 208. It is within the scope of this disclosure and as a non-limiting example that the central body portion 211 of the axle assembly housing 208 may be a banjo portion. Additionally it is within the scope of this disclosure and as a non-limiting example that the first axle half shaft housing 252 of the axle assembly housing 208 may be integrally formed as part of, or may be integrally connected to at least a portion of, the central body portion 211 of the axle assembly hosing 208 of the drive unit assembly 200. As a non-limiting example, at least a portion of the second end portion 258 of the first axle assembly housing 208 may be connected to at least a portion of the central body portion 211 of the axle assembly housing 208 by using one or more welds, one or more mechanical fasteners, one or more adhesives, a spline connection, and/or a threaded connection.

The first axle half shaft 240 of the drive unit assembly 200 may include an increased diameter portion 264 circumferentially extending from at least a portion of the outer surface 248 thereof. As best seen in FIG. 5 of the disclosure and as a non-limiting example, the increased diameter portion 264 of the first axle half shaft 240 may be disposed outboard from at least a portion of an end of the plurality of splines 250 of the first axle half shaft 240 opposite the first side gear 232 of the differential gear set 230.

Extending outward from at least a portion of the second end portion 226 of the differential case 218 is second outwardly extending portion 266. The second outwardly extending portion 266 of the differential case 218 may be of a size and shape to receive and/or retain at least a portion of the second side gear 234 of the differential gear set 230 and/or at least a portion of an end of a second axle half shaft 268 of the drive unit assembly 200. The second axle half shaft 268 may be of a size and shape needed to transmit the rotational power from the differential assembly 216 to one or more second wheel assemblies (not shown).

According to the embodiment illustrated in FIG. 5A and as a non-limiting example, the second axle half shaft 268 may have a first end portion 270, a second end portion 272, and an intermediate portion 274 interposed between the first and second end portions 270 and 272 of the second axle half shaft 268. At least a portion of the second end portion 272 of the second axle half shaft 268 may be drivingly connected to at least a portion of the one or more second wheel assemblies (not shown). At least a portion of the first end portion 270 of the second axle half shaft 268 may be drivingly connected to at least a portion of the second side gear 234 of the differential gear set 230 of the differential assembly 216.

In accordance with the embodiment illustrated in FIG. 5A and as a non-limiting example, the first end portion 270 of the first axle half shaft 240 may be spliningly connected to at least a portion of the second side gear 234 of the differential gear set 230. According to this embodiment of the disclosure, a plurality of splines 276 may circumferentially extend along at least a portion of an outer surface 278 of the first end portion 270 of the second axle half shaft 268. The plurality of splines 276 of the second axle half shaft 268 are complementary to and meshingly engaged with at least a portion of a plurality of splines (not shown) of the second side gear 234 of the differential gear set 230.

As best seen in FIGS. 12 and 13 and as a non-limiting example, at least a portion of the second axle half shaft 268 may be received and/or retained within at least a portion of a second axle half shaft receiving portion 280 of a second axle half shaft housing 282 of the axle assembly housing 208 of the drive unit assembly 200. The second axle half shaft housing 282 of the axle assembly housing 208 has a first end portion 284, a second end portion 286, and an intermediate portion 288 interposed between the first and second end portions 284 and 286 of the second axle half shaft housing 282. At least a portion of the second end portion 272 of the second axle half shaft 268 may be disposed outward from at least a portion of the second end portion 286 of the second axle half shaft housing 282. At least a portion of the first end portion 284 of the second axle half shaft housing 282 may extend outward from an end of the central body portion 211 of the axle assembly housing 208 opposite the first axle half shaft housing 252. It is within the scope of this disclosure and as a non-limiting example that the second axle half shaft housing 282 of the axle assembly housing 208 may be integrally formed as part of, or may be integrally connected to at least a portion of, the central body portion 211 of the axle assembly hosing 208 of the drive unit assembly 200. As a non-limiting example, at least a portion of the first end portion 284 of the second axle assembly housing 282 may be connected to at least a portion of the central body portion 211 of the axle assembly housing 208 by using one or more welds, one or more mechanical fasteners, one or more adhesives, a spline connection, and/or a threaded connection.

The second axle half shaft 268 of the drive unit assembly 200 may include an increased diameter portion 290 circumferentially extending from at least a portion of the outer surface 278 thereof. As best seen in FIG. 5A of the disclosure and as a non-limiting example, the increased diameter portion 290 of the second axle half shaft 268 may be disposed outboard from at least a portion of an end of the plurality of splines 276 of the second axle half shaft 268 opposite the second side gear 234 of the differential gear set 230.

According to the embodiment illustrated in FIG. 4 and as a non-limiting example, the drive unit assembly 200 may include one or more anti-lock braking systems (ABS) 292 having one or more sensors 294 and one or more tone rings 296. As a non-limiting example that the one or more sensors 294 of the one or more anti-lock braking systems 292 may be removably connected to at least a portion of the axle assembly housing 208. In accordance with the embodiment illustrated in FIG. 4 and as a non-limiting example, the one or more sensors 294 may be selectively connected to at least a portion of a mounting portion 302 of the first member 209 of the axle assembly housing 208. The mounting portion 302 of the first member 209 of the axle assembly housing 208 may be a size and shape needed to connect the at least a portion of the first member 209 of the axle assembly housing 208 and/or to seal off at least a portion of the central body portion 211 of the axle assembly housing 208. In accordance with the embodiment illustrated in FIG. 4 and as a non-limiting example, the one or more sensors 294 of the one or more anti-lock braking systems 292 may extend through one or more apertures 304 extending through the mounting portion 302 of the first member 209 of the axle assembly housing 208. It is within the scope of this disclosure and as a non-limiting example that the one or more sensors 294 may be one or more ABS sensors. Additionally, it is within the scope of this disclosure and as a non-limiting example, the one or more sensors 294 may be secured to at least a portion of the axle assembly housing 208 by using one or more mechanical fasteners, one or more adhesives, one or more welds, a spline connection and/or a threaded connection.

The one or more sensors 294 may have a first end portion 298 disposed within the hollow interior portion 210 of the axle assembly housing 208 and a second end portion 300 that is disposed outside the axle assembly housing 208. At least a portion of the first end portion 298 of the one or more sensors 294 of the one or more anti-lock braking systems 292 of the drive unit assembly 200 may be disposed radially outboard from and proximate to at least a portion of the one or more tone rings 296 of the one or more anti-lock braking systems 292. The one or more sensors 294 of the one or more anti-lock braking systems 292 may be operably configured in order to sense the rotation of the one or more tone rings 296 of the one or more anti-lock braking systems 292. The data collected by the one or more sensors 294 of the one or more anti-lock braking systems 292, and analyzed by a control unit (not shown), aid in calculating and determining a speed of the one or more wheels (not shown) of the vehicle (not shown). This information may then be used by the control unit (not shown) to monitor the breaking of the one or more wheels (not shown) of the vehicle (not shown). If the control unit (not shown) determined that a slippage exists between the one or more wheels (not shown) of the vehicle (not shown), an alert will be sent to the one or more anti-lock braking systems 292. Once alerted, the one or more anti-lock braking systems 292 of the vehicle (not shown) will activate and will override the manual or operator controlled braking of the vehicle (not shown) to prevent the vehicle (not shown) from losing traction and causing a crash condition.

According to the embodiment illustrated in FIG. 4 and as a non-limiting example, at least a portion of the one or more tone rings 296 of the one or more anti-lock braking systems 292 may be disposed outboard from at least a portion of the first and second side gears 232 and 234 of the differential assembly 216. As a result, it is within the scope of this disclosure and as a non-limiting example that the differential assembly 216 may be interposed between the one or more tone rings 296 of the one or more anti-lock braking systems 292. It is within the scope of this disclosure and as a non-limiting example that the one or more tone rings 296 of the one or more anti-lock braking systems 292 may be integrally formed as part of or integrally connected to at least a portion of the first and second side gears 232 and 234 of the differential assembly 216. As a result, it is therefore to be understood that the one or more tone rings 296 may rotate with the first and second side gears 232 and 234 of the differential assembly 216.

In order to aid in sensing the rotation of the one or more tone rings 296 of the one or more anti-lock braking systems 292, the one or more tone rings 296 may include one or more tone ring teeth 306. As best seen in FIG. 4 and as a non-limiting example, the one or more tone ring teeth 306 may extend outward form at least a portion of an outer surface 308 of the one or more tone rings 296 of the one or more anti-lock braking systems 292. At least a portion of the one or more sensors 294 of the one or more anti-lock braking systems 292 may be disposed proximate to and outboard from at least a portion of the one or more tone ring teeth 306 extending from the outer surface 308 of the one or more tone rings 296. It is within the scope of this disclosure and as a non-limiting example that the one or more tone rings 296 may be connected to at least a portion of the first and/or second side gears 232 and/or 234 by using one or more welds, one or more mechanical fasteners, one or more adhesives, a threaded connection and/or spline connection.

As best seen in FIG. 3 of the disclosure and as a non-limiting example, the one or more tone rings 296 of the one or more anti-lock braking systems 292 may include a central opening 310 extending therethrough. The central opening 310 within the one or more tone rings 296 may be of a size and shape to receive and/or retain at least a portion of the first or second axle half shaft 240 or 268 therein. Additionally, central opening 310 within the one or more tone rings 296 may be of a size and shape to allow the plurality of splines 250 and 276 of the first and second axle half shafts 240 and 268 to engage a complementary set of splines (not shown) on the first and second side gears 232 and 234 of the differential assembly 216.

As best seen in FIGS. 7 and 8 and as a non-limiting example, the one or more guide members 202 may have a body portion 312 with an outer peripheral surface 314, a first end portion 316, a second end portion 318, and an intermediate portion 320 interposed between the first and second end portions 316 and 318. The one or more guide members 202 may be of a size and shape needed during assembly of the drive unit assembly 200 to guide the ends of the first and second axle half shafts 240 and 268 into driving engagement with the first and second side gears 232 and 232 without damaging the one or more tone rings 296 of the one or more anti-lock braking systems 292. It is within the scope of this disclosure and as a non-limiting example that the one or more guide members 202 may be integrally formed as part of the axle assembly housing 208 or as one or more separate components that are selectively connectable to at least a portion of the axle assembly housing 208 of the drive unit assembly 200.

The second end portion 318 of the body portion 312 of the one or more guide members 202 may include one or more attachment portions 322. At least a portion of the one or more attachment portions 322 of the body portion 312 of the one or more guide members 202 is disposed within the hollow interior portion 210 of the central body portion 211 of the axle assembly housing 208. The one or more attachment portions 322 of the one or more guide members 202 is selectively connectable with at least a portion of an inner surface 324 of the central body portion 211 of the axle assembly housing 208. It is within the scope of this disclosure and as a non-limiting example that the one or more attachment portions 322 of the one or more guide members 202 may be connected to at least a portion of the central body portion 211 by using one or more welds, one or more adhesives, one or more mechanical fasteners, a press-fit connection, a snap-fit connection, or any other type of connection sufficient to selectively and securely attach at least a portion of the one or more guide members 202 within the central body portion 211 of the axle assembly housing 208.

According to the embodiment illustrated in FIGS. 7 and 8 and as a non-limiting example, the intermediate portion 320 of the body portion 312 of the one or more guide members 202 may include a first angularly bent portion 326. The first angularly bent portion 326 may provide the body portion 312 of the one or more guide members 202 with a substantially V-shape. As a result of the bend in the body portion 312 of the one or more guide members 202, the first and second end portions 316 and 318 may be disposed outward from the intermediate portion 320 of the body portion 213 of the one or more guide members 202. The first angularly bent portion 326 of the one or more guide members 202 provides the body portion 312 of the one or more guide members 202 with a first extending portion 328 and a second extending portion 330 extending at an angle θ1 relative to each other. Additionally, the first and second extending portions 328 and 330 of the one or more guide members 202 extend away from said first angularly bent portion 326. It is within the scope of this disclosure and as a non-limiting example that the angle θ1 may be such that the second end portion 318 of the one or more guide members applies a biasing force against the inner surface 324 of the first and second axle half shaft housings 252 and 282 of the axle assembly housing 208 thereby aiding in securing the second end portion 318 of the one or more guide members 202 within the first and second axle half shaft housings 252 and 282.

The second end portion 318 of the body portion 312 of the one or more guide members 202 may include a second angularly bent portion 332 defining a third extending portion 334. At least a portion of the second angularly bent portion 332 and/or the third extending portion 334 of the body portion 312 of the one or more guide members 202 may be in direct contact with and may apply the biasing force onto the inner surface 324 of the first and second axle half shaft housings 252 and 282 of the axle assembly housing 208. As best seen in FIG. 8 and as a non-limiting example, second and third extending portions 330 and 334 may extend at an angle θ2 relative to each other. Additionally, the second and third extending portions 330 and 334 may extend away from each other away from the second angularly bent portion 332 of the body portion 312 of the one or more guide members 202. As a non-limiting example that at least a portion of the third extending portion 334 of the one or more guide members 202 may be connected to at least a portion of the first and second axle half shaft housings 252 and 282 or may simply be in contact with and not connected to the first and second axle half shaft housings 252 and 282 of the axle assembly housing 208. It is within the scope of this disclosure and as a non-limiting example that the angle θ2 may be larger than the angle θ1.

In accordance with the embodiment illustrated in FIG. 8 and as a non-limiting example, the second angularly bent portion 332 may be disposed a distance D1 from the first angularly bent portion 326 of the body portion 312 of the one or more guide members 202. The distance D1 may be a distance needed to ensure that a sufficient biasing force is applied by the second angularly bent portion 332 and/or the third extending portion 334 onto the inner surface 324 of the first and second axle half shaft housings 252 and 282 to hold the second end portion 318 of the one or more guide members 202 securely in place during operation of the drive unit assembly 200. This aids in reducing the overall noise, vibration, and harshness (NVH) characteristics of the drive unit assembly 200 and aids in increasing the overall life and durability of the one or more guide members 202.

As best seen in FIGS. 7 and 8 of the disclosure and as a non-limiting example, the intermediate portion 320 of the body portion 312 of the one or more guide members 202 may include one or more shaft receiving portions 336. The one or more shaft receiving portions 336 in the one or more guide members 202 may be used in order to aid in guiding the first or second axle half shaft 240 or 268 through the central opening 310 of the one or more tone rings 296 without damaging the one or more tone rings 296. Additionally, the one or more shaft receiving portions 336 in the one or more guide members 202 may be used in order to aid in attaching the one or more tone rings 296 to the first or second axle half shaft 240 or 268. As a result, the one or more shaft receiving portions 336 in the body portion 312 of the one or more guide members 202 may be of a size and shape to receive at least a portion of the first or second axle half shaft 240 or 268 therein. At least a portion of the one or more shaft receiving portions 336 of the one or more guide members 202 may be disposed within at least a portion of the first angularly bent portion 326, the first extending portion 328, and/or the second extending portion 330 of the body portion 312 of the one or more guide members 202. A bottom portion 338 of the one or more shaft receiving portions 336 of the one or more guide members 202 may extend substantially parallel to the first or second axle half shafts 240 or 268 of the drive unit assembly 200. It is within the scope of this disclosure and as a non-limiting example that the one or more shaft receiving portions 336 of the one or more guide members 202 may have a substantially V-shaped cross-sectional shape.

As the first or second axle half shaft 240 or 268 are inserted within the first or second axle half shaft housings 252 or 282 of the axle assembly housing 208, the first extending portion 328 of the body portion 312 of the one or more guide members 202 may guide an end of the first or second axle half shaft 240 or 268 into the one or more shaft receiving portions 336 of the one or more guide members 202. Once within the one or more shaft receiving portions 336 of the one or more guide members 202, the increased diameter portion 264 or 290 of the first or second axle half shaft 240 or 268 may be driven into direct contact with at least a portion of the one or more shaft receiving portions 336 of the one or more guide members 202. The interaction between the one or more shaft receiving portions 336 of the one or more guide members 202 and the increased diameter portions 264 or 290 of the first or second axle half shaft 240 or 268 aid in centering the end of the first or second axle half shaft 240 or 268 relative to the central opening 310 of the one or more tone rings 296.

The increased diameter portions 264 or 290 of the first or second axle half shaft 240 or 268 may be disposed a distance D2 and D3 respectively from an end of the first or second axle half shaft 240 or 268. The distance D2 and D3 may be substantially equal to or slightly less than a distance from the one or more shaft receiving portions 336 of the one or more guide members 202 to the one or more tone rings 296. This aids in ensuring that the end of the first or second axle half shaft 240 or 268 are co-axial with the one or more tone rings 296 during insertion of the first or second axle half shaft 240 or 268.

Once the first and second axle half shaft 240 and 268 have been installed, a gap may exist between the outer surface 248 and 278 the first and second axle half shaft 240 and 268 and the one or more shaft receiving portions 336 of the one or more guide members 302 of the drive unit assembly 200. This aids in reducing or eliminating the overall amount of friction between the first or second axle half shaft 240 or 268 and the one or more guide members 202 when the drive unit assembly 200 is in operation. Additionally, this aids in reducing the overall NVH characteristics of the drive unit assembly 200 when in operation. As a result, the gap between the first and second axle half shaft 240 and 268 and the one or more guide members 202 aids in increasing the overall life and durability of the first or second axle half shaft 240 or 268 and the one or more guide members 202.

Additionally, once the first and second axle half shafts 240 and 268 have been installed, at least a portion of the increased diameter portions 264 or 290 may be in direct contact with at least a portion of the one or more tone rings 296. As a result, at least a portion of the increased diameter portions 264 or 290 may engage at least a portion of the one or more tone rings 296 to allow the one or more tone rings 296 to rotate with the first or second axle half shafts 240 or 268.

According to an embodiment of the disclosure and as a non-limiting example, the one or more guide members 202 may include one or more lubricant guide portions 340 and/or one or more lubricant apertures 342. The one or more lubricant guide portions 340 of the one or more guide members 202 aid in directing an amount of lubricating fluid 346 from a primary sump 348 located within the central body portion 211 of the axle assembly housing 208 into one or more secondary sumps 350 within the first and/or second axle half shaft housings 252 and/or 282 of the axle assembly housing 208. As the differential assembly 216 rotates, an amount of lubricating fluid 346 is collected by the ring gear 214 within the primary sump 348 and flung from the ring gear 214 due to the centrifugal forces exerted on the lubricating fluid 346 as the ring gear 214 rotates. An amount of the lubricating fluid 346 flung from the ring gear 214 and the differential assembly 216 is collected by the one or more lubricant guide portions 340 of the one or more guide members 202 and may travel along with one or more lubricant guide portions 340 through the one or more lubricant apertures 342 and into the one or more secondary sumps 350. As a result, it is within the scope of this disclosure and as a non-limiting example that at least a portion of the one or more lubricant guide portions 340 of the one or more guide members may be disposed proximate to at least a portion of the ring gear 214 and/or the differential case 218 of the differential assembly 216.

As best seen in FIGS. 7 and 8 of the disclosure and as a non-limiting example, the one or more lubricant guide portions 340 and the one or more lubricant apertures 342 may be located within the first extending portion 328 of the body portion 312 of the one or more guide members 202. In particular, the one or more lubricant guide portions 340 and the one or more lubricant apertures 342 may be interposed between the first angularly bent portion 326 and the one or more attachment portions 322 of the body portion 312 of the one or more guide members 202. It is within the scope of this disclosure and as a non-limiting example that the one or more lubricant apertures 342 in the body portion 312 of the one or more guide members 202 may have a substantially quadrilateral shape. Additionally, it is within the scope of this disclosure and as a non-limiting example that at least a portion of the one or more lubricant guide portions 340 may extend outward away from the body portion 312 of the one or more guide members 202 from a side of the one or more lubricant apertures 342 in one or more guide members 202. As a non-limiting example, the one or more lubricant guide portions 340 and the one or more lubricant apertures 342 of the one or more guide members 202 may be formed by a punch forming process, a laser cutting process, or may be formed by one or more forging processes.

The one or more lubricant guide portions 340 of the one or more guide members 202 may extend outward away from the body portion 312 of the one or more guide members 202 at an angle θ4 relative to a center line C1 extending through the axle assembly housing 208 of the drive unit assembly 200. It is therefore to be understood that the one or more lubricant guide portions 340 may extend at the angle θ4 away from the center line C1 of the axle assembly housing 208. By placing the one or more lubricant guide portions 340 at the angle θ4 it allows the lubrication fluid 346 to easily travel along the length of the lubricant guide portions 340 and into the one or more secondary sumps 350.

In accordance with the embodiment illustrated in FIGS. 7 and 8 of the disclosure and as a non-limiting example, the one or more lubricant guide portions 340 of the one or more guide members 202 may include one or more lubricant collection portions 344. The one or more lubricant collection portions 344 may be used in order to aid in collecting and amount of lubricating fluid 346 flung from the ring gear 214 and/or differential assembly 216 and directing the flow of the lubricating fluid 346 along the one or more lubricant guide portions 340 and into the one or more secondary sumps 350. It is within the scope of this disclosure and as a non-limiting example that the one or more lubricant collection portions 344 may have a substantially V-shape or any other shape capable of collecting and directing the flow of an amount of lubricating fluid 346.

According to an embodiment of the disclosure and as a non-limiting example, at least a portion of the outer peripheral surface 314 of the one or more guide members 202 may have a shape that is complementary to at least a portion of the inner surface defining the first and second axle half shaft receiving portions 254 and 280 of the first and second axle half shaft housings 252 and 282 of the axle assembly housing 208. As a result, at least a portion of the outer peripheral surface 314 of the one or more guides 202 may be substantially sealingly engaged with at least a portion of the inner surface defining the first and second axle half shaft receiving portions 254 and 280 of the first and second axle half shaft housings 252 and 282 of the axle assembly housing 208.

In accordance with an embodiment of the disclosure and as a non-limiting example, the outer peripheral surface 314 of the one or more guide members 202 may include one or more sealing members (not shown) having a size and shape needed to sealingly engage with at least a portion of the inner surface 324 of the axle assembly housing 208 defining the first and second axle half shaft receiving portions 254 and 280 of the first and second axle half shaft housings 252 and 282. This aids in defining the one or more secondary sumps 350 within the first and second axle half shaft receiving portions 254 and 280 of the first and second axle half shaft housings 252 and 282 of the axle assembly housing 208. By providing one or more secondary sumps 350 within the first and second axle half shaft housings 252 and 282 it aids in maintaining the primary sump 348 within the central body portion 211 of the axle assembly housing 208 at a pre-determined optimal level. This aids in reducing the churning losses associated with the rotation of the ring gear 214 and the differential assembly 216 within the lubricating fluid 346 within the primary sump 348 thereby increasing the overall efficiency of the drive unit assembly 200. It is therefore to be understood that at least a portion of the second and third extending portions 330 and 334 of the body portion 312 of the one or more guide members 202 may form at least a portion of the one or more secondary sumps 350 of the axle assembly housing 208.

As a non-limiting example, the bottom portion 338 of the one or more shaft receiving portions 336 of the one or more guide members 202 may extend at an angle θ3 relative to a rotational axis A1 of the first axle half shaft 240 or at an angle θ3 relative to a rotational axis A2 of the second axle half shaft 268. This aids in directing the flow of lubricating fluid 346 from the one or more secondary sumps 350 to the primary sump 348 of the drive unit assembly 200.

At least a portion of an embodiment of the one or more guide members 202 described and illustrated herein may be disposed above and/or below at least a portion of the first and/or second axle half shafts 240 and/or 268.

Figure 15:
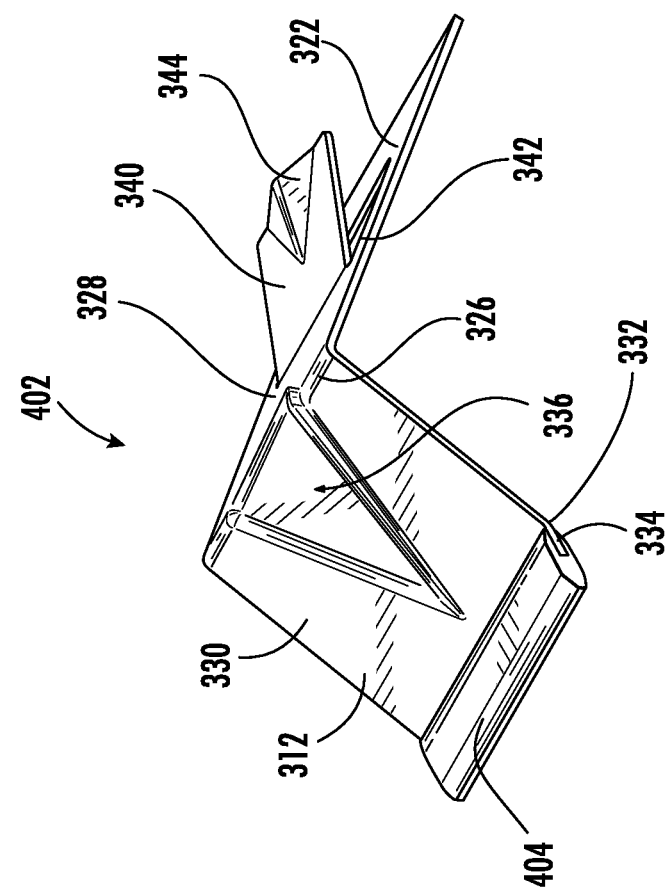
FIG. 15 is a schematic perspective view of the one or more guide members according to the embodiment illustrated in FIG. 14 of the disclosure.
Figure 14:
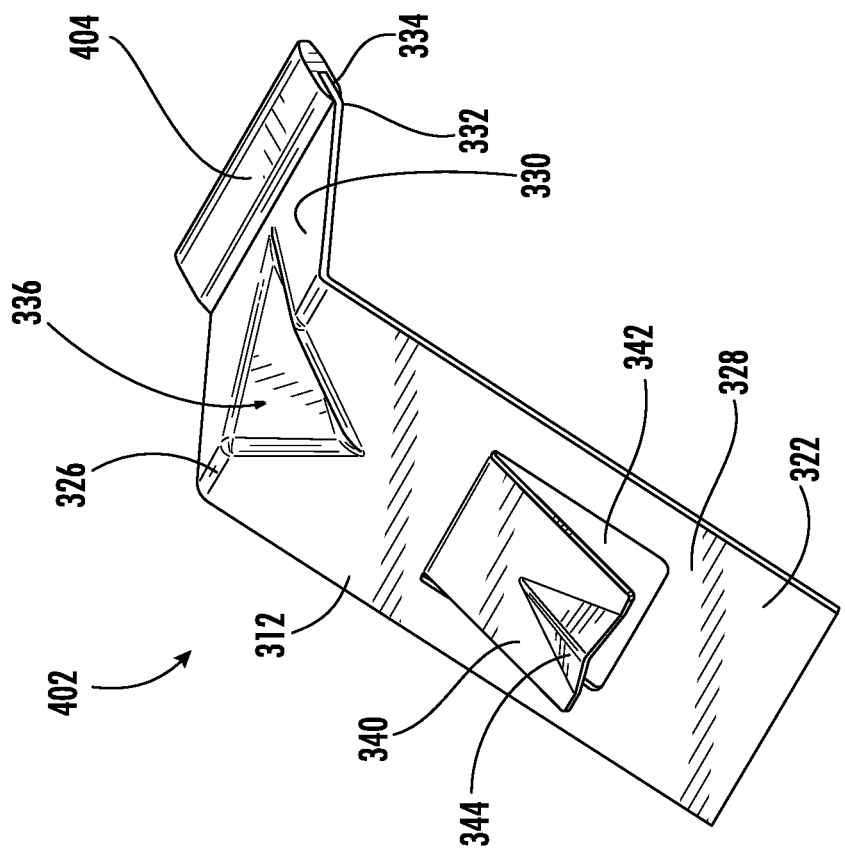
FIG. 14 is a schematic perspective view of one or more guide members according to an alternative embodiment of the disclosure.

FIGS. 14 and 15 provide a schematic perspective view of one or more guide members 402 according to an alternative embodiment of the disclosure. The one or more guide members 402 illustrated in FIGS. 14 and 15 is the same of the one or more guide members 202 illustrated in FIGS. 3-14, except where specifically noted below. In accordance with the embodiment illustrated in FIGS. 14 and 15 of the disclosure and as a non-limiting example, the one or more guide members 402 may include one or more vibration reduction members 404.

In accordance with the embodiment illustrated in FIGS. 14 and 15 and as a non-limiting example, at least a portion of the one or more vibration reduction members 404 may be connected to at least a portion of the second extending portion 330, the second angularly bent portion 332, and/or the third extending portion 334 of the one or more guide members 402. The one or more vibration reduction members 404 may be used in order to aid in reducing or eliminating an amount of vibration between the one or more guide members 402 and the inner surface 324 of the first and/or second axle half shaft housings 252 and/or 282 of the axle assembly housing 208. This aids in reducing the overall NVH characteristic of the drive unit assembly 200 and aids in increasing the overall life and durability of the one or more guide members 402 and the axle assembly housing 208. It is within the scope of this disclosure and as a non-limiting example that the one or more vibration reduction members 404 may be made of a polymeric material, an elastomeric material, a rubber material, or any other type of material that is capable of reducing or eliminating an amount of vibration between the one or more guide members 402 and the first and/or second axle half shaft housings 252 and/or 282.

The one or more vibration reduction members 404 may also be used to provide a sealing engagement between the one or more guide members 402 and the inner surface 324 of the first and/or second axle half shaft housings 252 and/or 282 of the axle assembly housing 208. As a result, it is therefore to be understood that the one or more vibration reduction members 404 may be used in order to form at least a portion of the one or more secondary sumps 350 within the first and/or second axle half shaft housings 252 and/or 282 of the axle assembly housing 208.

According to an embodiment of the disclosure and as a non-limiting example, the one or more vibration reduction members 404 may be selectively connectable to at least a portion of the second extending portion 330, the second angularly bent portion 332, and/or the third extending portion 334 of the one or more guide members 402. It is within the scope of this disclosure and as a non-limiting example that the one or more vibration reduction members 404 may be connected to at least a portion of the one or more guide members 402 by using one or more welds, one or more mechanical fasteners, one or more adhesives, a press-fit connection, or a snap-fit connection.

In accordance with an alternative embodiment of the disclosure, and as a non-limiting example, the one or more vibration reduction members 404 may be secured to at least a portion of the second extending portion 330, the second angularly bent portion 332, and/or the third extending portion 334 of the one or more guide members 402 by an overmoulding process or an injection moulding process.

Figure 16:
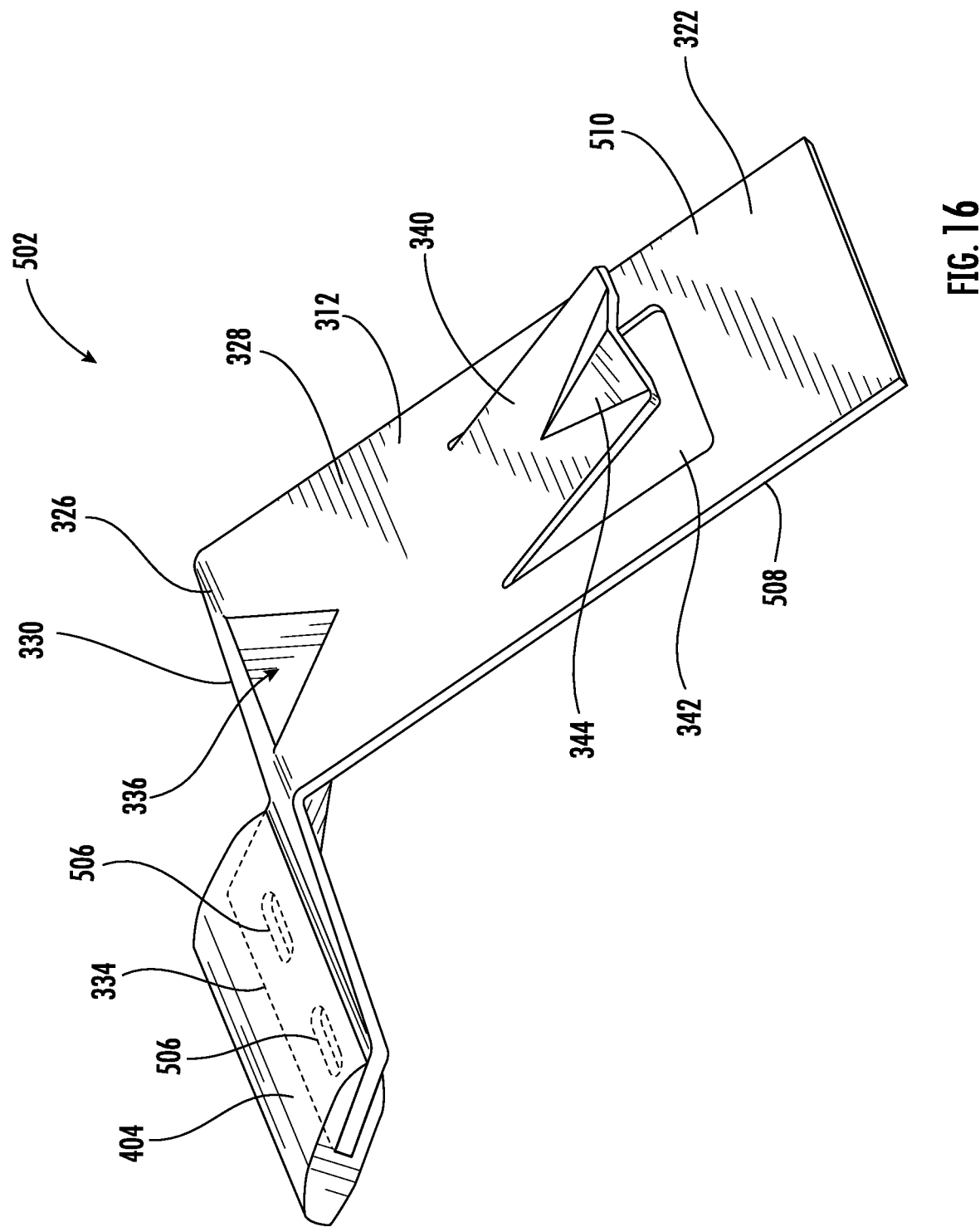
FIG. 16 is a schematic perspective view of one or more guide members according to an another embodiment of the disclosure.

FIG. 16 provides a schematic perspective view of one or more guide members 502 according to another embodiment of the disclosure. The one or more guide members 502 illustrated in FIG. 16 is the same of the one or more guide members 202 and 402 illustrated in FIGS. 3-15, except where specifically noted below. In accordance with the embodiment illustrated in FIG. 16 of the disclosure and as a non-limiting example, the one or more guide members 502 may include one or more vibration reduction member retention portions 506.

According to the embodiment illustrated in FIG. 16 and as a non-limiting example, the one or more vibration reduction member retention portions 506 may extend from an inner surface 508 to an outer surface 510 of the third extending portion 334 of the body portion 312 of the one or more guide members 502. The one or more vibration reduction member retention portions 506 may be of a size and shape to receive and/or retain at least a portion of the one or more vibration reduction members 404 of the one or more guide members 502 therein. This aids in securing the one or more vibration reduction members 404 relative to the one or more guide members 502 thereby aiding in increasing the overall life and durability of the one or more guide members 502. It is within the scope of this disclosure and as a non-limiting example that the one or more vibration reduction member retention portions 506 may substantially oval in shape or any other shape needed to receive and/or retain at least a portion of the one or more vibration reduction members 404 therein.

Figure 17:
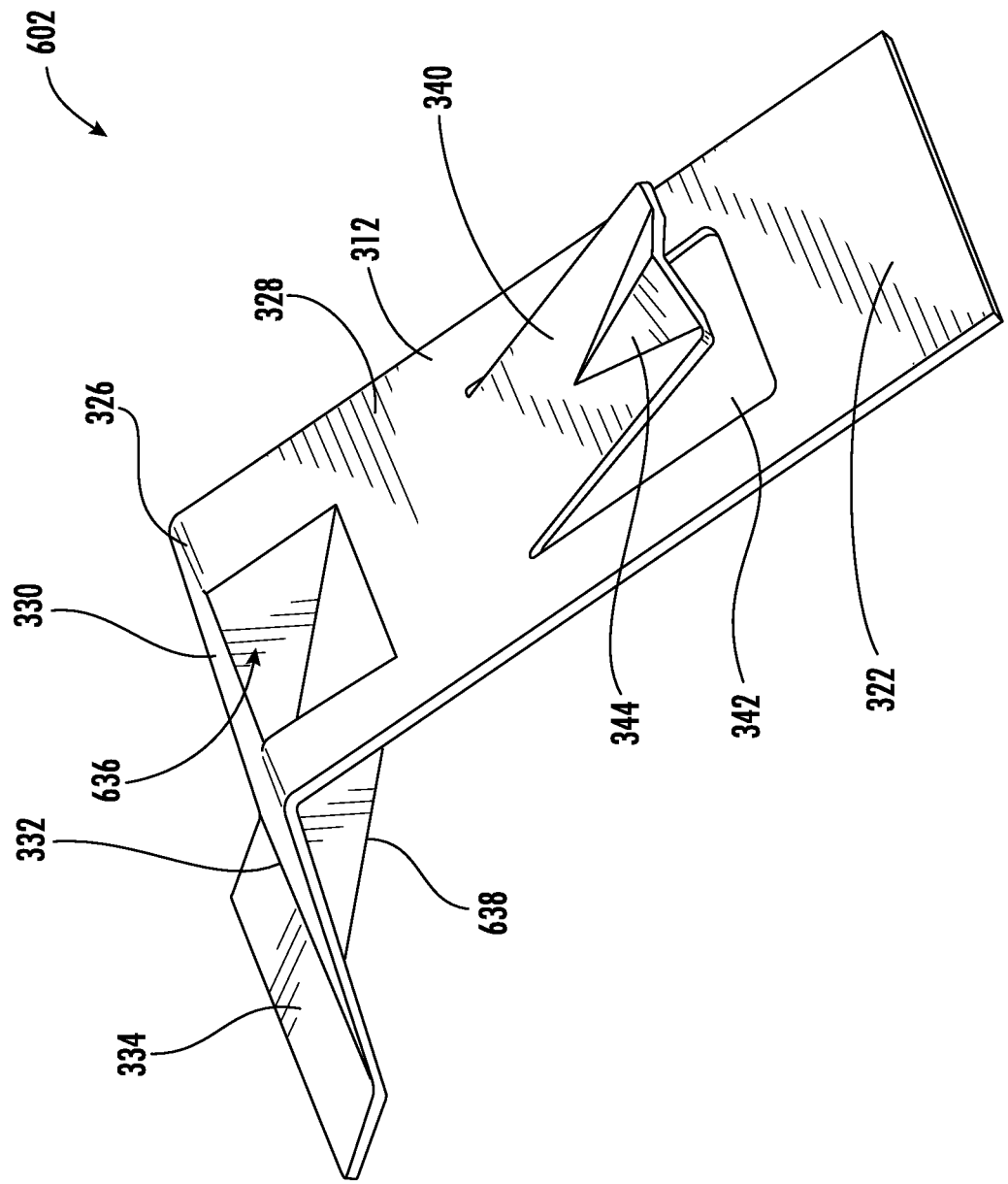
FIG. 17 is a schematic perspective view of one or more guide members according to yet another embodiment of the disclosure.

FIG. 17 provides a schematic perspective view of one or more guide members 602 according to yet another embodiment of the disclosure. The one or more guide members 602 illustrated in FIG. 17 is the same of the one or more guide members 202, 402, and 502 illustrated in FIGS. 3-16, except where specifically noted below. In accordance with the embodiment illustrated in FIG. 17 of the disclosure and as a non-limiting example, the one or more guide members 602 may include one or more shaft receiving portions 636. The one or more shaft receiving portions 636 in the body portion 312 of the one or more guide members 602 may have a different shape than the one or more shaft receiving portions 336 previously described herein, however the one or more shaft receiving portions 636 have the same function as previously described herein.

In accordance with the embodiment illustrated in FIG. 17 and as a non-limiting example, the one or more shaft receiving portions 636 in the one or more guide members 602 may be used in order to aid in guiding the first or second axle half shaft 240 or 268 through the central opening 310 of the one or more tone rings 296 without damaging the one or more tone rings 296. Additionally, the one or more shaft receiving portions 636 in the one or more guide members 602 may be used in order to aid in attaching the one or more tone rings 296 to the first or second axle half shaft 240 or 268. As a result, the one or more shaft receiving portions 636 in the body portion 312 of the one or more guide members 602 may be of a size and shape to receive at least a portion of the first or second axle half shaft 240 or 268 therein. At least a portion of the one or more shaft receiving portions 636 of the one or more guide members 602 may be disposed within at least a portion of the first angularly bent portion 326, the first extending portion 328, and/or the second extending portion 330 of the body portion 312 of the one or more guide members 602. A bottom portion 638 of the one or more shaft receiving portions 636 of the one or more guide members 602 may extend substantially parallel to the first or second axle half shafts 240 or 268 of the drive unit assembly 200. It is within the scope of this disclosure and as a non-limiting example that the one or more shaft receiving portions 636 of the one or more guide members 602 may have a substantially rectangular or square cross-sectional shape.

As the first or second axle half shaft 240 or 268 are inserted within the first or second axle half shaft housings 252 or 282 of the axle assembly housing 208, the first extending portion 328 of the body portion 312 of the one or more guide members 602 may guide an end of the first or second axle half shaft 240 or 268 into the one or more shaft receiving portions 636 of the one or more guide members 602. Once within the one or more shaft receiving portions 636, the increased diameter portion 264 or 290 of the first or second axle half shaft 240 or 268 may be driven into direct contact with at least a portion of the one or more shaft receiving portions 636 of the one or more guide members 602. The interaction between the one or more shaft receiving portions 636 of the one or more guide members 602 and the increased diameter portions 264 or 290 of the first or second axle half shaft 240 or 268 aid in centering the end of the first or second axle half shaft 240 or 268 relative to the central opening 310 of the one or more tone rings 296.

Once the first and second axle half shaft 240 and 268 have been installed, a gap may exist between the outer surface 248 and 278 the first and second axle half shaft 240 and 268 and the one or more shaft receiving portions 636 of the one or more guide members 602 of the drive unit assembly 200. This aids in reducing or eliminating the overall amount of friction between the first or second axle half shaft 240 or 268 and the one or more guide members 602 when the drive unit assembly 200 is in operation and aids in reducing the overall NVH characteristics of the drive unit assembly 200. As a result, the gap between the first and second axle half shaft 240 and 268 and the one or more guide members 602 aids in increasing the overall life and durability of the first or second axle half shaft 240 or 268 and the one or more guide members 602.

Figure 18:
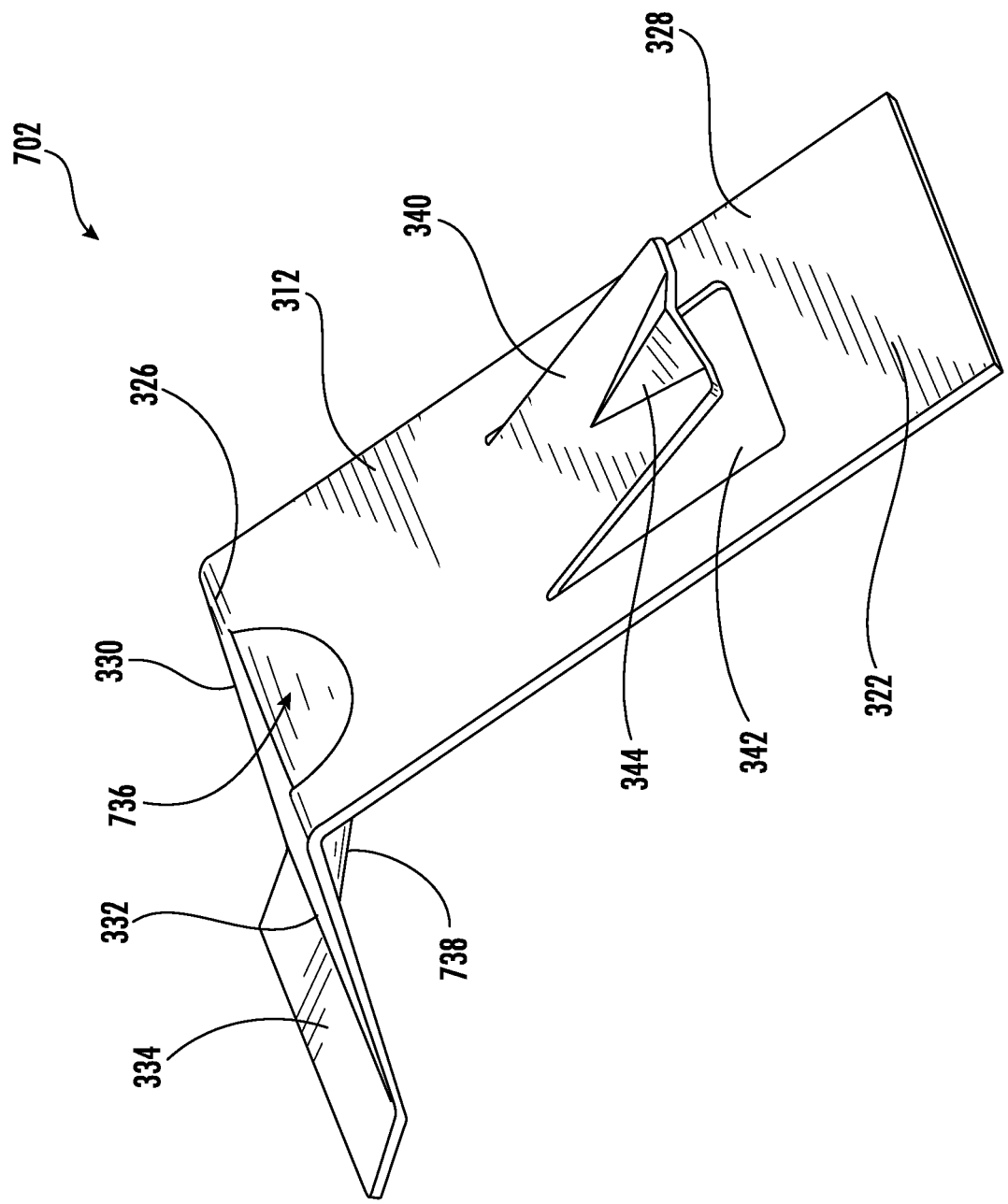
FIG. 18 is a schematic perspective view of one or more guide members according to still yet another embodiment of the disclosure.

FIG. 18 provides a schematic perspective view of one or more guide members 702 according to still yet another embodiment of the disclosure. The one or more guide members 702 illustrated in FIG. 18 is the same of the one or more guide members 202, 402, 502, and 602 illustrated in FIGS. 3-17, except where specifically noted below. In accordance with the embodiment illustrated in FIG. 18 of the disclosure and as a non-limiting example, the one or more guide members 702 may include one or more shaft receiving portions 736. The one or more shaft receiving portions 736 in the body portion 312 of the one or more guide members 702 have a different shape that the one or more shaft receiving portions 336 and 636 previously described herein however the one or more shaft receiving portions 736 have the same function as previously described herein.

In accordance with the embodiment illustrated in FIG. 18 and as a non-limiting example, the one or more shaft receiving portions 736 in the one or more guide members 702 may be used in order to aid in guiding the first or second axle half shaft 240 or 268 through the central opening 310 of the one or more tone rings 296 without damaging the one or more tone rings 296. Additionally, the one or more shaft receiving portions 736 in the one or more guide members 702 may be used in order to aid in attaching the one or more tone rings 296 to the first or second axle half shaft 240 or 268. As a result, the one or more shaft receiving portions 736 in the body portion 312 of the one or more guide members 702 may be of a size and shape to receive at least a portion of the first or second axle half shaft 240 or 268 therein. At least a portion of the one or more shaft receiving portions 736 of the one or more guide members 702 may be disposed within at least a portion of the first angularly bent portion 326, the first extending portion 328, and/or the second extending portion 330 of the body portion 312 of the one or more guide members 702. A bottom portion 738 of the one or more shaft receiving portions 736 of the one or more guide members 702 may extend substantially parallel to the first or second axle half shafts 240 or 268 of the drive unit assembly 200. It is within the scope of this disclosure and as a non-limiting example that the one or more shaft receiving portions 736 of the one or more guide members 702 may have a substantially cylindrical or semi-circular cross-sectional shape.

As the first or second axle half shaft 240 or 268 are inserted within the first or second axle half shaft housings 252 or 282 of the axle assembly housing 208, the first extending portion 328 of the body portion 312 of the one or more guide members 702 may guide an end of the first or second axle half shaft 240 or 268 into the one or more shaft receiving portions 736 of the one or more guide members 702. Once within the one or more shaft receiving portions 736, the increased diameter portion 264 or 290 of the first or second axle half shaft 240 or 268 may be driven into direct contact with at least a portion of the one or more shaft receiving portions 736 of the one or more guide members 702. The interaction between the one or more shaft receiving portions 736 of the one or more guide members 702 and the increased diameter portions 264 or 290 of the first or second axle half shaft 240 or 268 aid in centering the end of the first or second axle half shaft 240 or 268 relative to the central opening 310 of the one or more tone rings 296.

Once the first and second axle half shaft 240 and 268 have been installed, a gap may exist between the outer surface 248 and 278 the first and second axle half shaft 240 and 268 and the one or more shaft receiving portions 736 of the one or more guide members 702 of the drive unit assembly 200. This aids in reducing or eliminating the overall amount of friction between the first or second axle half shaft 240 or 268 and the one or more guide members 702 when the drive unit assembly 200 is in operation and aids in reducing the overall NVH characteristics of the drive unit assembly 200. As a result, the gap between the first and second axle half shaft 240 and 268 and the one or more guide members 702 aids in increasing the overall life and durability of the first or second axle half shaft 240 or 268 and the one or more guide members 702.

Figure 19:
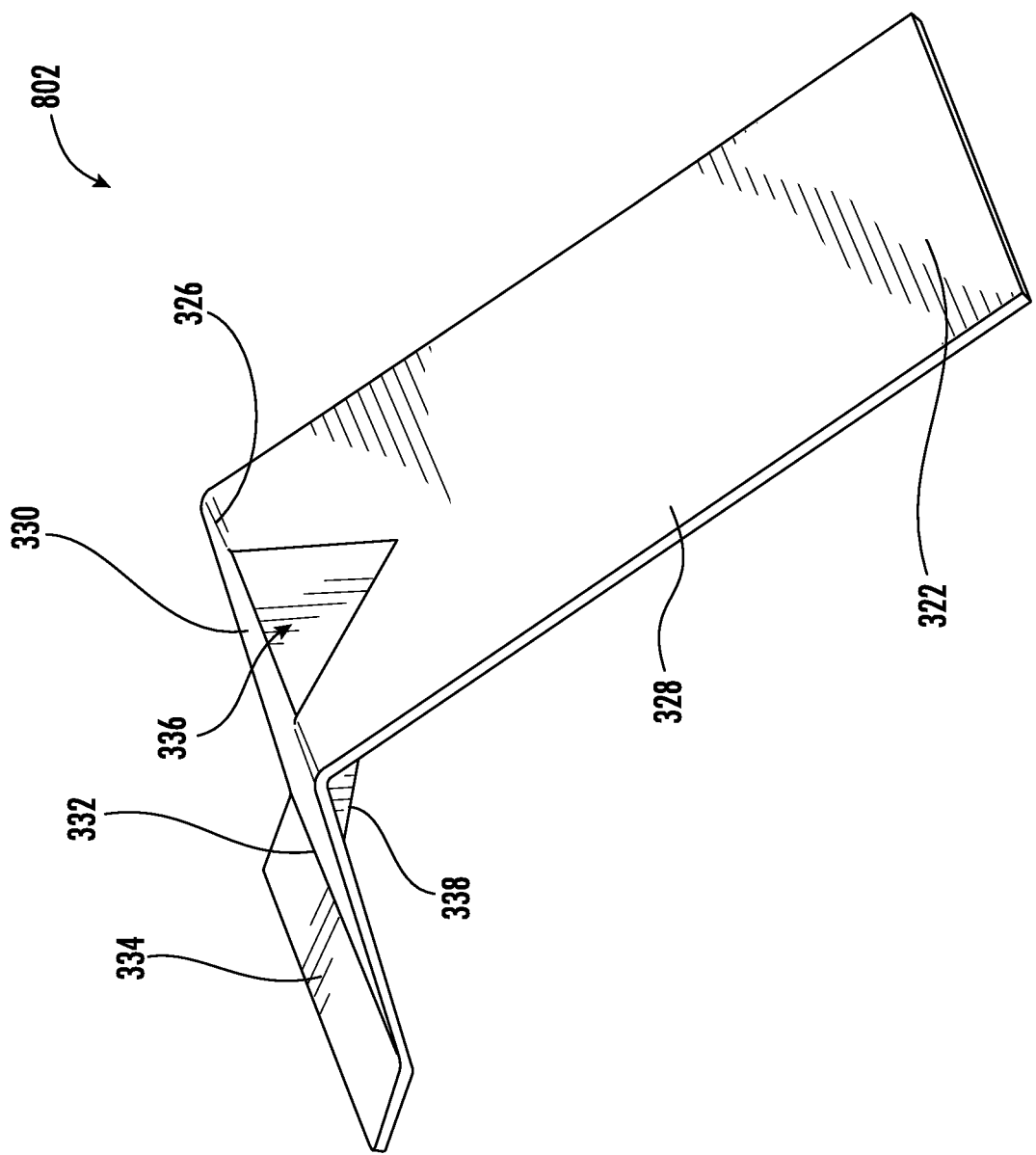
FIG. 19 is a schematic perspective view of one or more guide members according to still yet another embodiment of the disclosure.

FIG. 19 provides a schematic perspective view of one or more guide members 802 according to still yet another embodiment of the disclosure. The one or more guide members 802 illustrated in FIG. 19 is the same of the one or more guide members 202, 402, 502, 602, and 702 illustrated in FIGS. 3-18, except where specifically noted below. In accordance with the embodiment illustrated in FIG. 19 of the disclosure and as a non-limiting example, the one or more guide members 802 does not include the one or more lubricant guide portions 340, the one or more lubricant apertures 342, and/or the one or more lubricant collection portions 344 described and illustrated herein. As a result, it is within the scope of this disclosure that, except for the one or more shaft receiving portions 336, the first extending portion 328 may be substantially flat.

It is within the scope of this disclosure and as a non-limiting example that the one or more guide members 802 may be used in a lower portion of the central body portion 211, the first axle half shaft housing 252, and the second axle half shaft housing 282 while the one or more guide members 202, 402, 502, 602, and/or 702 may be used in an upper portion of the central body portion 211, the first axle half shaft housing 252, and the second axle half shaft housing 282 of the axle assembly housing 208. By using the one or more guide members 802 in the lower portion of the central body portion 211, the first axle half shaft housing 252, and the second axle half shaft housing 282 the volumetric capacity of the one or more second reservoirs 350 may be increased or maximized. This aids in ensuring that the primary sump 348 is maintained at a pre-determined optimal level at all times during operation of the drive unit assembly 200.

Figure 20:
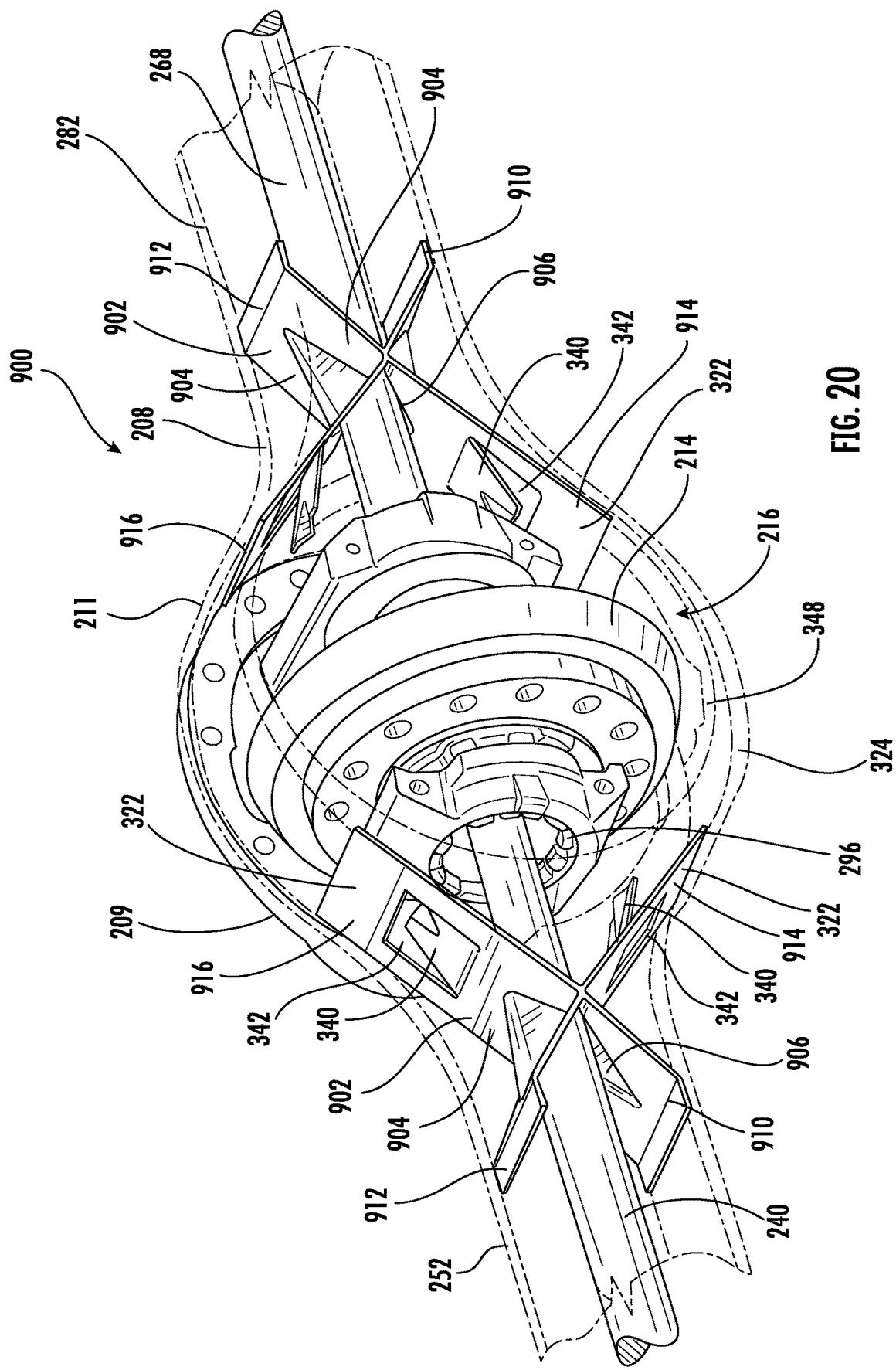
FIG. 20 is a schematic perspective view of one or more guide members according to still yet a further another embodiment of the disclosure.

FIG. 20 provides a schematic perspective view of the drive unit assembly 900 having one or more guide members 902 according to still yet a further another embodiment of the disclosure. The one or more guide members 902 illustrated in FIG. 20 is the same of the one or more guide members 202, 402, 502, 602, 702, and 802 illustrated in FIGS. 3-19, except where specifically noted below. The one or more guide members 902 may have a different shape than the one or more guide members 202, 402, 502, 602, 702, and 802 previously described herein, however the one or more guide members 902 function in the same way as previously described.

In accordance with the embodiment illustrated in FIG. 20 and as a non-limiting example, the one or more guide members used in the upper portion and the lower portion of the central body portion 211, the first axle half shaft housing 252, and the second axle half shaft housing 282 may be a single unitary component and not separate components. As a result, it is within the scope of this disclosure and as a non-limiting example that the one or more guide members 902 may be made by using additive manufacturing processes, injection moulding processes, or forging processes. Additionally, it is within the scope of this disclosure and as a non-limiting example that the one or more guide members 902 may be integrally formed as part of the axle assembly housing 208 or may be selectively connected to at least a portion of the axle assembly housing 208. In accordance with the embodiment where the one or more guide members 902 are connected to the axle assembly housing 208, the one or more guide members 902 may be connected to at least a portion of the central body portion 211 by using one or more welds, one or more adhesives, one or more mechanical fasteners, a press-fit connection, a snap-fit connection, or any other type of connection sufficient to selectively and securely attach at least a portion of the one or more guide members 902 within the central body portion 211 of the axle assembly housing 208.

As best seen in FIG. 20 and as a non-limiting example, the one or more guide members 902 may include a central body portion 904 having one or more shaft receiving portions 906 extending therethrough having a size and shape to receive at least a portion of the first or second axle half shaft 240 or 268 therein. Additionally, the one or more shaft receiving portions 906 of the one or more guide members 902 may aid in centering the end of the first or second axle half shaft 240 or 268 with the relative to the central opening 310 of the one or more tone rings 296. The one or more shaft receiving portions 906 may be of any size and shape needed to receive and center the end of the first or second axle half shaft 240 or 268 with the relative to the central opening 310 of the one or more tone rings 296. It is within the scope of this disclosure and as a non-limiting example that the one or more shaft receiving portions 906 may have a substantially quadrilateral cross-sectional shape, a substantially diamond cross-sectional shape, a substantially square cross-sectional shape, a substantially rectangular cross-sectional shape, or a substantially circular cross-sectional shape.

In accordance with the embodiment illustrated in FIG. 20 and as a non-limiting example, the one or more guide members 902 may include a first extending portion 910, a second extending portion 912, a third extending portion 914, and/or a fourth extending portion 916 extending outward and away from the central body portion 904 of the one or more guide members 902. At least a portion of the first and second extending portions 910 and 912 may be disposed within the first or second axle half shaft receiving portions 254 or 280 of the first or second axle half shaft housings 252 or 282. Additionally, at least a portion of the third and fourth extending portions 914 and 916 may be disposed within at least a portion of the central body portion 211 of the axle assembly housing 208.

The first and/or second extending portions 910 and/or 912 may include the use of the one or more vibration reduction members 404 described and illustrated previously herein.

The third and/or fourth extending portions 914 and/or 916 may include the one or more attachment portions 322, the one or more lubricant guide portions 340, the one or more lubricant apertures 342, and/or the one or more lubricant collection portions 344 described and illustrated herein. As a result, it is within the scope of this disclosure and as a non-limiting example that at least a portion of the one or more attachment portions 322 of the third and fourth extending portions 914 and 916 of the one or more guide members 902 may be connected to at least a portion of the inner surface 324 of the central body portion 211 of the axle assembly housing 208. As a non-limiting example that the one or more attachment portions 322 of the one or more guide members 902 may be connected to at least a portion of the central body portion 211 by using one or more welds, one or more adhesives, one or more mechanical fasteners, a press-fit connection, a snap-fit connection, or any other type of connection sufficient to selectively and securely attach at least a portion of the one or more guide members 902 within the central body portion 211 of the axle assembly housing 208.

It is within the scope of this disclosure that the various embodiments of the disclosure described and illustrated herein may be combined with one another to make an axle system according to an embodiment of the disclosure.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A guide member, comprising:
   a body portion with an outer peripheral surface, a first end portion, a second end portion, and an intermediate portion interposed between said first and second end portions; and
   one or more vibration reduction members;
      wherein said intermediate portion has a first angularly bent portion defining a first extending portion and a second extending portion extending outward therefrom;
      wherein said body portion of said guide member has one or more shaft receiving portions;

wherein said second end portion of said body portion of said guide member comprises a second angularly bent portion;
wherein said second extending portion and a third extending portion extend outward away from said second angularly bent portion; and
wherein said one or more vibration reduction members are connected to at least a portion of said second extending portion, said third extending portion, and/or said second angularly bent portion of said body portion of said guide member.

2. The guide member of claim 1, wherein said one or more shaft receiving portions are disposed within at least a portion of said first angularly bent portion, said first extending portion, and/or said second extending portion of said body portion of said guide member.

3. The guide member of claim 1, wherein said one or more shaft receiving portions in said body portion of said guide member have a size and shape needed to receive at least a portion of an axle half shaft therein.

4. The guide member of claim 3, wherein said one or more shaft receiving portions in said body portion of said guide member aid in centering an end of said axle half shaft relative to a central opening within one or more tone rings to prevent damaging said one or more tone rings.

5. The guide member of claim 1, wherein said one or more shaft receiving portions have a substantially V-shaped cross-sectional shape, a substantially quadrilateral cross-sectional shape, a substantially rectangular cross-sectional shape, a substantially square cross-sectional shape, a substantially circular cross-sectional shape, or a substantially semi-circular cross-sectional shape.

6. The guide member of claim 1, wherein said first end portion of said body portion of said guide member comprises one or more attachment portions; and
wherein said one or more attachment portions of said guide member are connectable to at least a portion of an inner surface of a central body portion of an axle assembly housing.

7. The guide member of claim 1, wherein said first extending portion comprises one or more lubricant guide portions and/or one or more lubricant apertures.

8. The guide member of claim 7, wherein said one or more lubricant guide portions aid in directing an amount of lubricating fluid from a primary sump within a central body portion of an axle assembly housing to one or more secondary sumps within a first axle half shaft housing and/or a second axle half shaft housing of said axle assembly housing; and
wherein said one or more lubricant apertures allow passage of an amount of said lubricating fluid from said primary sump into said one or more secondary sumps.

9. The guide member of claim 8, wherein said one or more lubricant guide portions comprises one or more lubricant collection portions; and
wherein said one or more lubricant collection portions aid in collecting an amount of said lubricating fluid expelled from said primary sump.

10. The guide member of claim 8, wherein said one or more shaft receiving portions have a bottom portion; and
wherein said bottom portion of said one or more shaft receiving portions in said body portion of said guide member extend at an angle relative to a rotational axis of an axle half shaft allowing an amount of lubricating fluid to transition from said one or more secondary sumps into said primary sump.

11. The guide member of claim 7, wherein at least a portion of said one or more lubricant guide portions are disposed proximate to a ring gear and/or a differential case of a differential assembly.

12. The guide member of claim 7, where at least a portion of said one or more lubricant guide portions extend outward from at least a portion of said one or more lubricant apertures.

13. The guide member of claim 1, wherein at least a portion of said second extending portion, said third extending portion, and/or said second angularly bent portion of said guide member are disposed within at least a portion of a first axle half shaft housing or a second axle half shaft housing of an axle assembly housing.

14. The guide member of claim 1, wherein an angle $\theta 1$ is between said first extending portion and said second extending portion of said body portion of said guide member; and
wherein an angle $\theta 2$ is between said second extending portion and said third extending portion of said body portion of said guide member.

15. The guide member of claim 14, wherein said angle $\theta 1$ is less than said angle $\theta 2$.

16. The guide member of claim 1, wherein at least a portion of said second extending portion and/or said third extending portion of said body portion of said guide member form at least a portion of a secondary sump disposed within a first axle half shaft housing or a second axle half shaft housing of an axle assembly housing.

17. A guide member, comprising:
a body portion with an outer peripheral surface, a first end portion, a second end portion, and an intermediate portion interposed between said first and second end portions;
one or more vibration reduction members; and
one or more vibration reduction member retention portions;
wherein said intermediate portion has a first angularly bent portion defining a first extending portion and a second extending portion extending outward therefrom;
wherein said body portion of said guide member has one or more shaft receiving portions;
wherein said second end portion of said body portion of said guide member comprises a second angularly bent portion;
wherein said second extending portion and a third extending portion extend outward away from said second angularly bent portion;
wherein said one or more vibration reduction members are connected to at least a portion of said second extending portion, said third extending portion, and/or said second angularly bent portion of said body portion of said guide member;
wherein at least a portion of said one or more vibration reduction member retention portions are disposed within said third extending portion of said body portion of said guide member; and
wherein said one or more vibration reduction member retention portions have a size and shape to receive and/or retain at least a portion of said one or more vibration reduction members therein.

18. A guide member, comprising:
a body portion with an outer peripheral surface, a first end portion, a second end portion, and an intermediate portion interposed between said first and second end portions;

wherein said intermediate portion has a first angularly bent portion defining a first extending portion and a second extending portion extending outward therefrom;
wherein said body portion of said guide member has one or more shaft receiving portions; and
wherein said one or more shaft receiving portions engage an increased diameter portion of an axle half shaft to center an end of said axle half shaft relative to a central opening within one or more tone rings to prevent damaging said one or more tone rings.

* * * * *